INVENTORS.
C. WALTON MUSSER
PAUL L. FOX

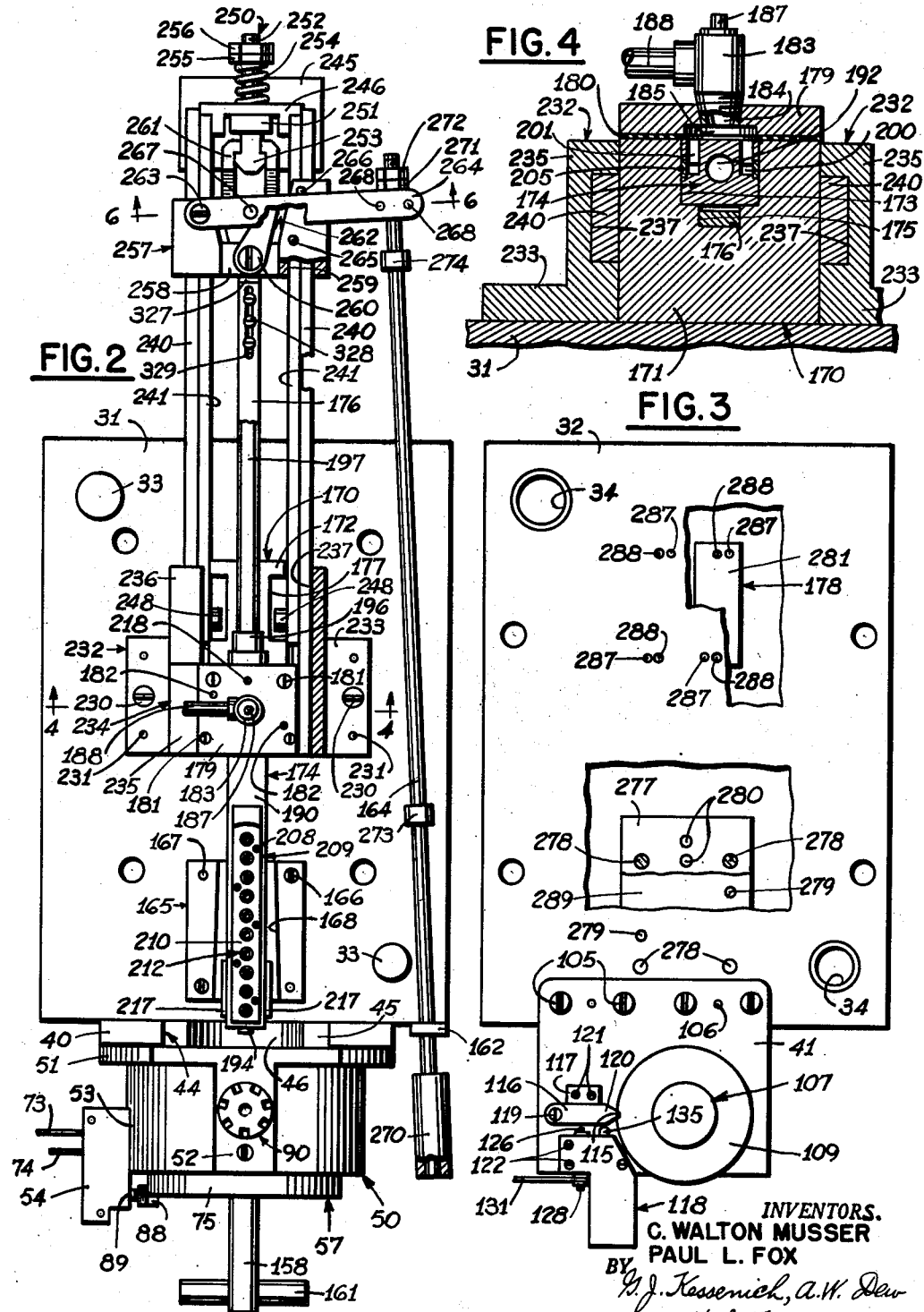

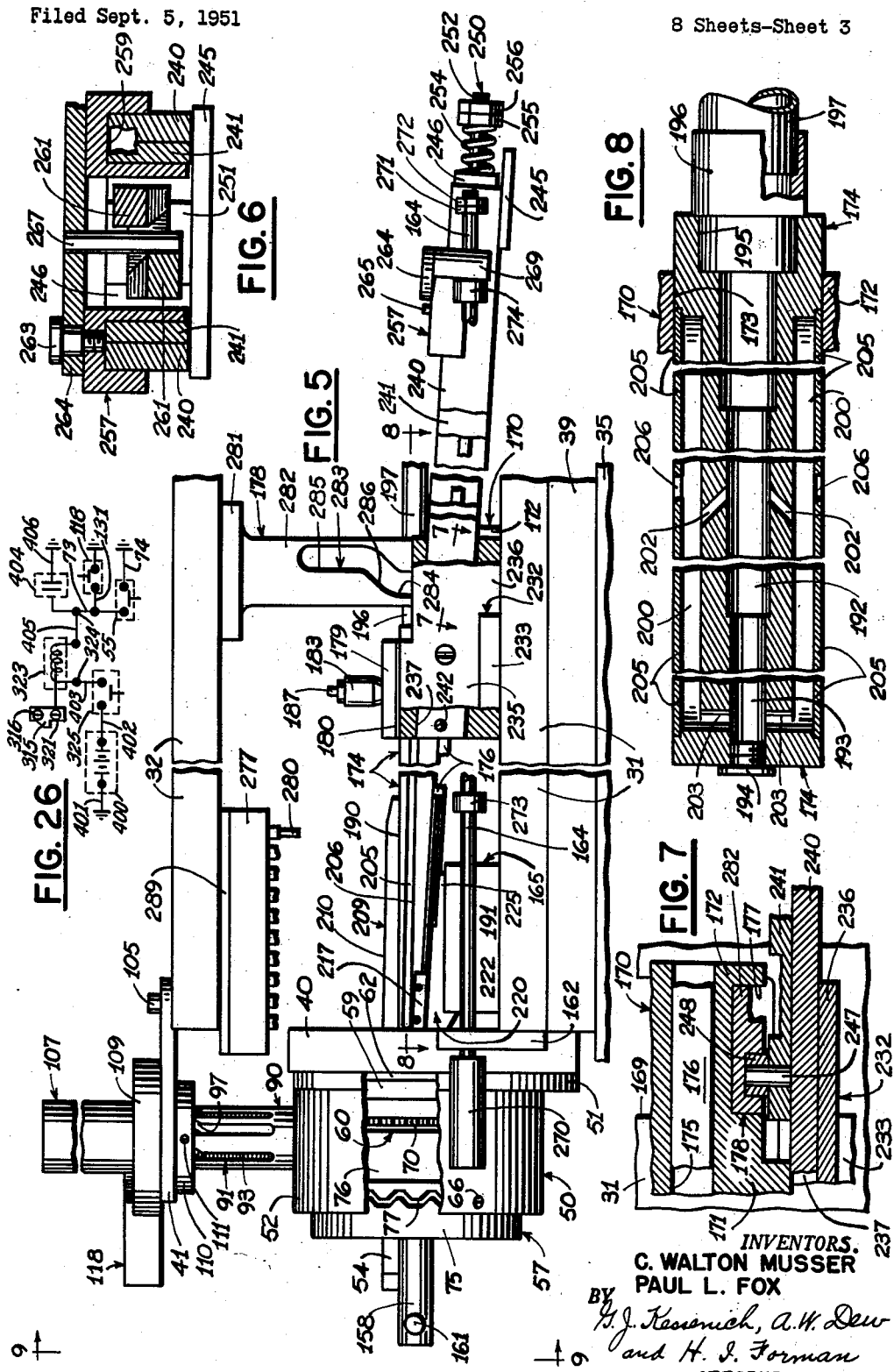

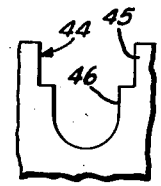
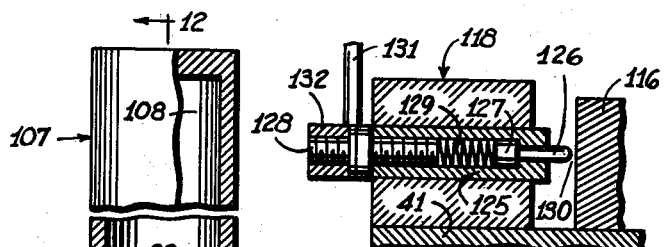
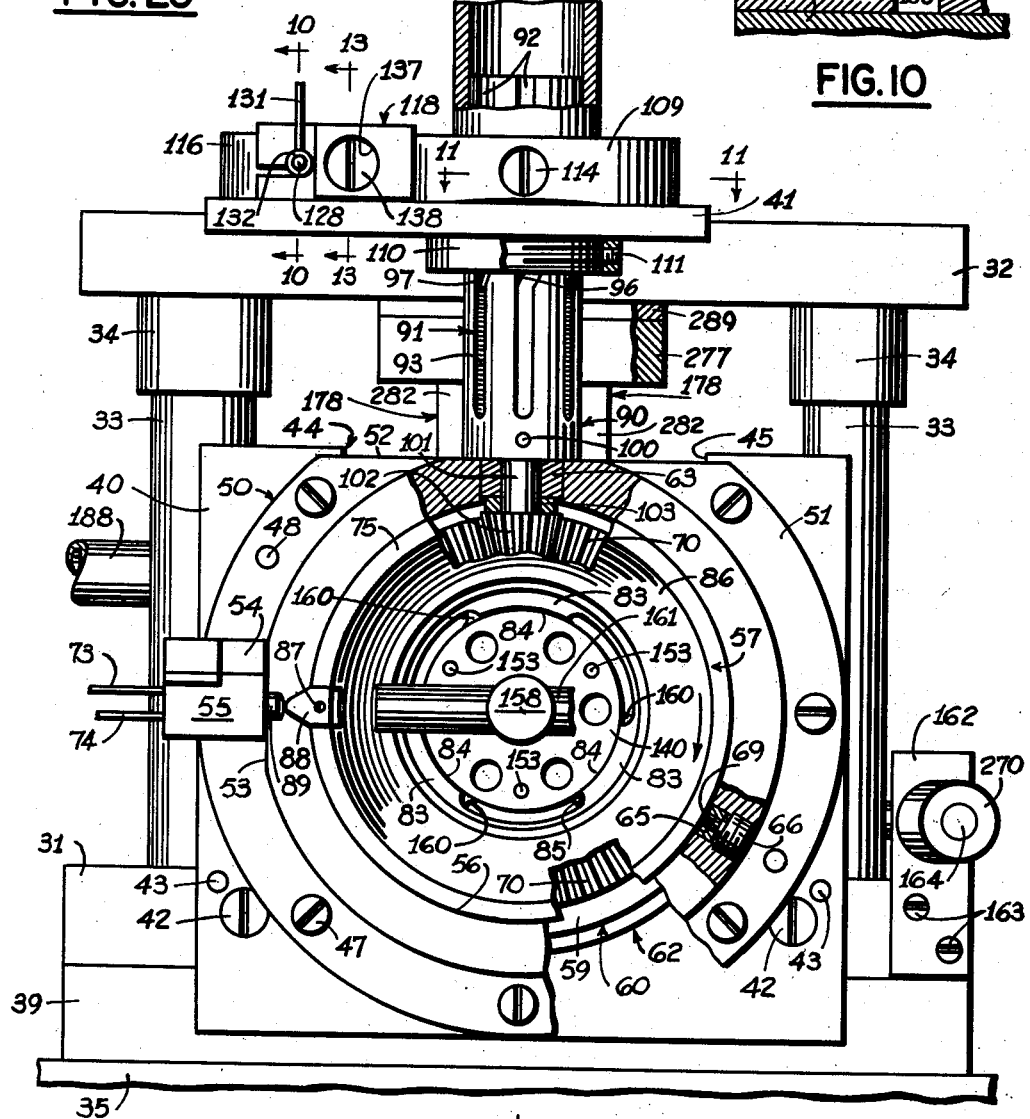
FIG. 25
FIG. 10
FIG. 9
INVENTORS.
C. WALTON MUSSER
PAUL L. FOX
ATTORNEYS:

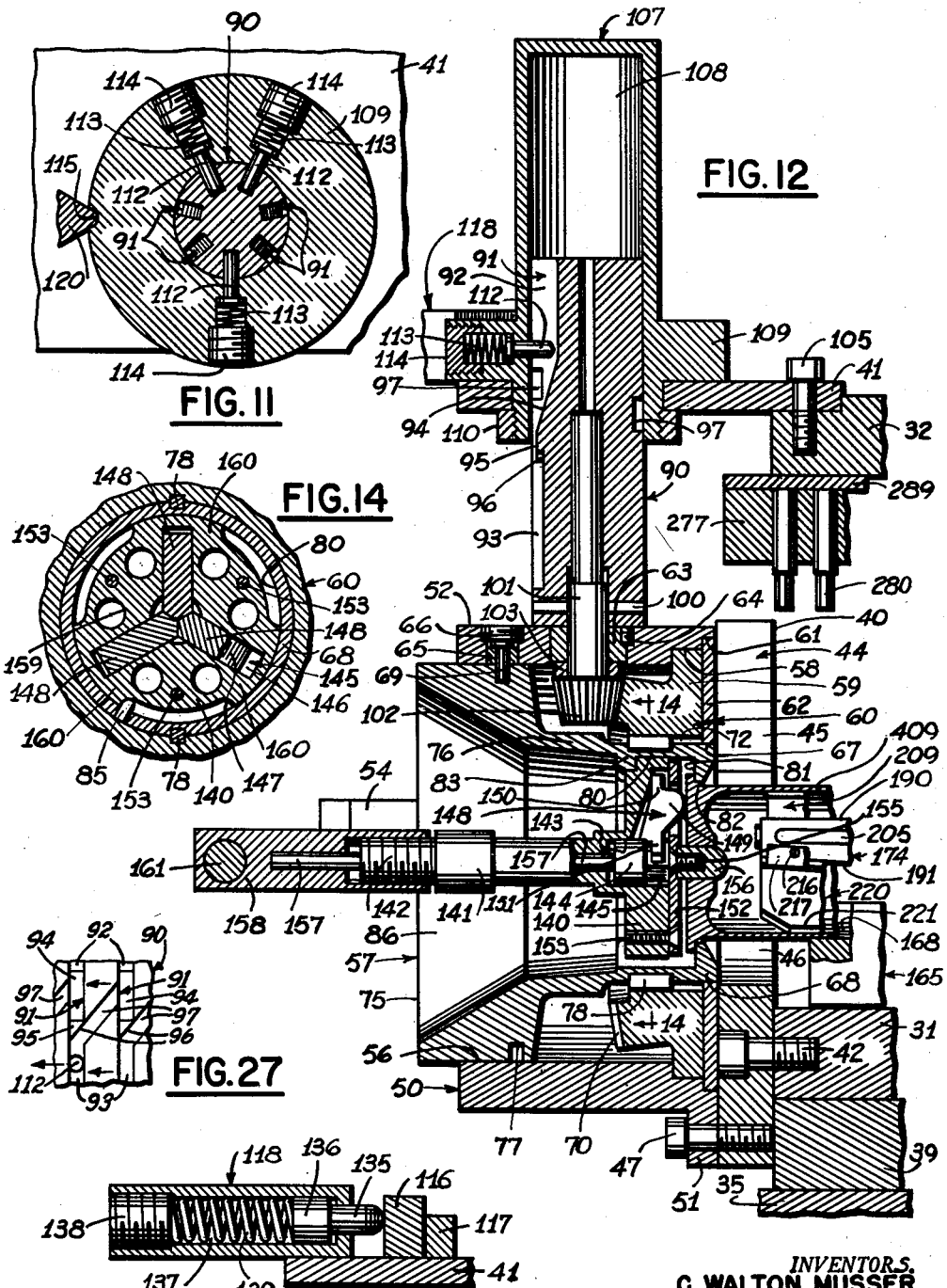

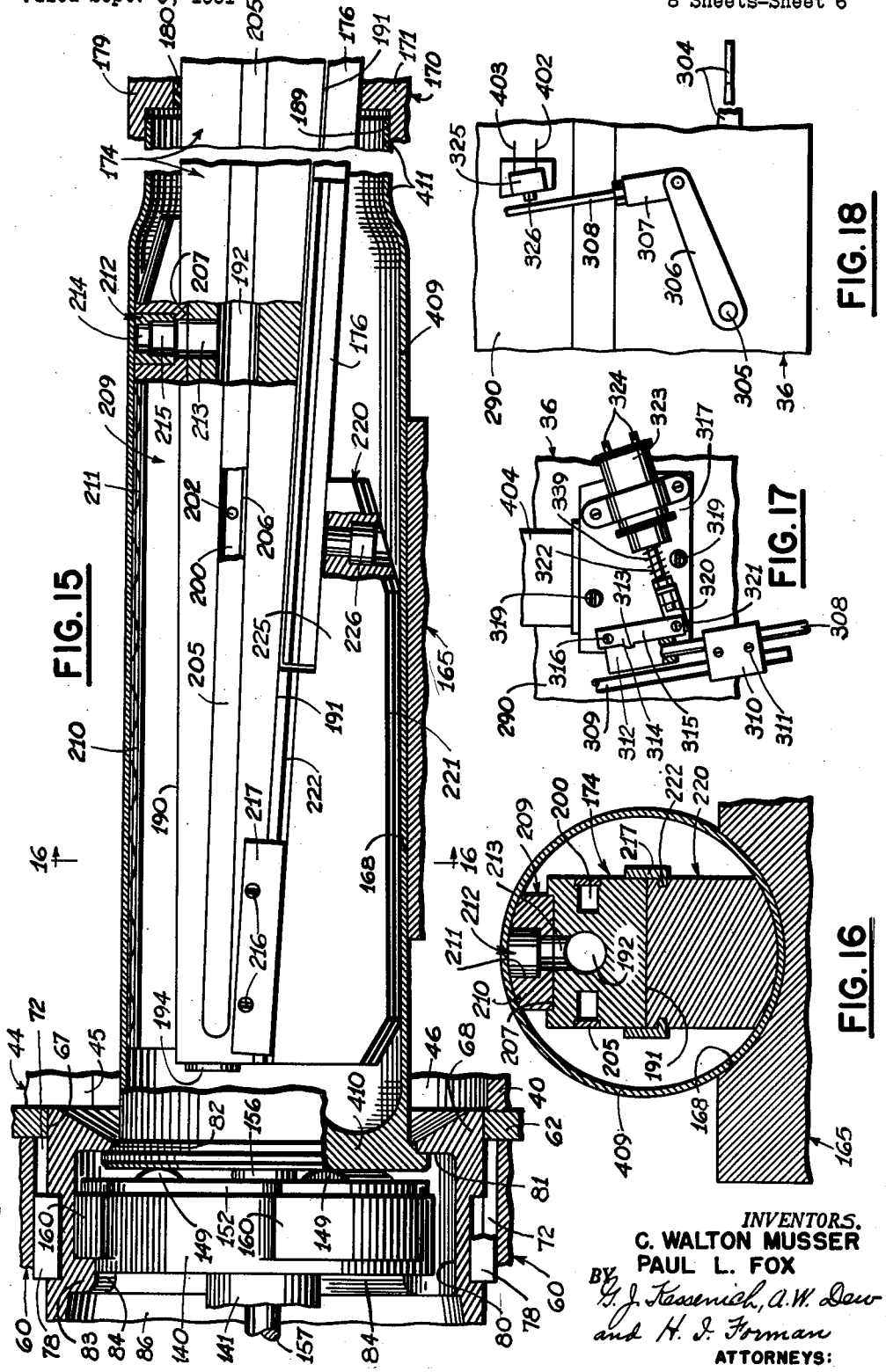

March 10, 1953 C. W. MUSSER ET AL 2,630,862
APPARATUS FOR PERFORATING HOLLOW CYLINDRICAL OBJECTS
Filed Sept. 5, 1951 8 Sheets-Sheet 7
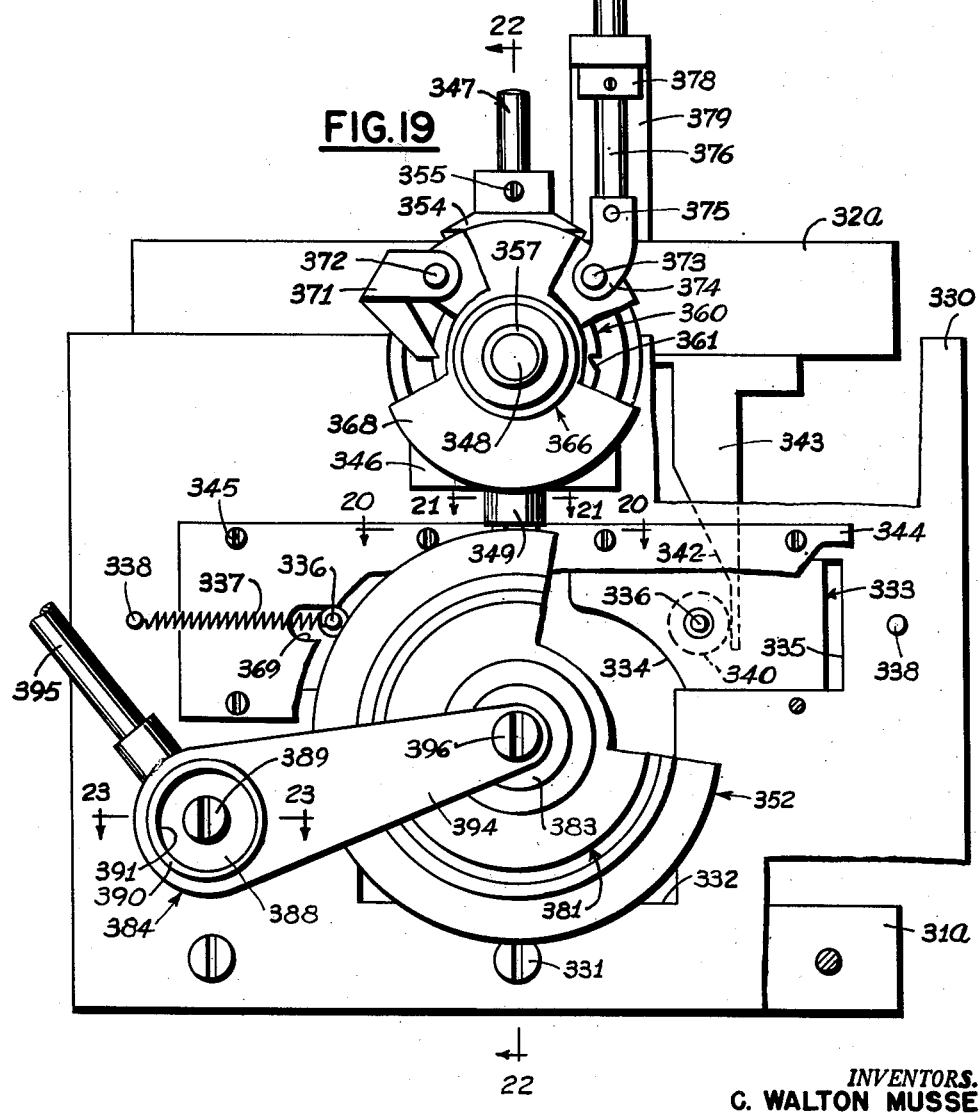
INVENTORS.
C. WALTON MUSSER
PAUL L. FOX
BY G. J. Kessenich, A. W. Dew
and H. I. Forman
ATTORNEYS March 10, 1953  C W. MUSSER ET AL  2,630,862
APPARATUS FOR PERFORATING HOLLOW CYLINDRICAL OBJECTS
Filed Sept. 5, 1951  8 Sheets-Sheet 8

INVENTORS.
C. WALTON MUSSER
PAUL L. FOX
BY G. J. Kessenich, A. W. Dew
and H. J. Forman
ATTORNEYS:

Patented Mar. 10, 1953

2,630,862

UNITED STATES PATENT OFFICE 2,630,862

APPARATUS FOR PERFORATING HOLLOW CYLINDRICAL OBJECTS

C. Walton Musser, Philadelphia, and
Paul L. Fox, Media, Pa.

Application September 5, 1951, Serial No. 245,224

6 Claims. (Cl. 164—108)

(Granted under Title 35, U. S. Code (1952), sec. 266)

The invention described herein may be manufactured and used by or for the Government for governmental purposes without the payment of any royalty thereon.

This invention relates broadly to perforating tapered, hollow, cylindrical objects and, although not limted solely thereto, has special reference to perforating the cartridge case sidewall of ammunition used in some recoilless weapons.

Ammunition of the type referred to in this application is exemplified in the following U. S. patents: 2,444,949, "Recoilless Firearm," to C. W. Musser, July 13, 1948; and 2,472,111, "Recoilless Firearm and Ammunition Therefor," to W. J. Kroeger et al., June 7, 1949. Those patents depict the ammunition round as having a cartridge case whose lateral surface is almost entirely perforated. A close examination of the perforations reveals that, in proceeding along the cartridge case's axis, the holes in alternate longitudinal rows are in line. It can also be seen that the holes in adjacent, alternate longitudinal rows are staggered in relation to each other. In considering the perforations from the radial point of view, i. e. proceeding by observation from hole to hole around the periphery of the cartridge case, it is seen that the perforations in each circumferential row are equally spaced around the case's periphery, and that the holes in adjacent circumferential rows are staggered in relation to each other.

As will be evident to those skilled in the art, in order to accomplish this order of perforation it is necessary that axial (i. e. along the axis of the cartridge case) and rotary (i. e. around the axis of the cartridge case) indexing be employed in some manner. A detailed description of exactly how we employ the dual indexing, in combination with other inventive features, to produce our perforating fixture will be made presently.

Since the recent advent of that type of recoilless firearm which uses ammunition having a laterally perforated cartridge case, various conventional ways of perforating the case wall have been proposed and utilized (e. g., U. S. Patent 1,764,129, "Apparatus for Perforating Casings," to Trumble et al., June 17, 1930; and 2,326,536, "Machine for Piercing Tubes," to Hartsock et al., August 10, 1943). Some of these methods were satisfactory, and some measure of success was attained by their use. However, none of the prior art methods embrace the same principles as our invention which, we believe, is more practicable than prior art devices and constitutes definite progress and inventive advance in the art.

In our fixture, which is constructed upon a well known die set for use in a punch press type of machine, the head end of the cartridge case whose sidewall is to be perforated is clamped in an intermittently operative axially and rotatably indexable chuck associated with the fixture's lower fixed plate. At the same time, a longitudinal portion of the case's sidewall is supported from inside by a die block located in an anvil, also associated with the fixture's lower plate, which extends inside the case from its open, mouth end. An oppositely located, longitudinal portion of the cartridge case's sidewall is supported underneath from the outside by a cradle in which the case rests. The anvil in our fixture is provided with a sliding wedge which serves a twofold purpose. When manually operated, it aids loading and unloading of our fixture. When operated automatically during normal operation of the fixture, and aided by the cradle in addition to the wall thickness of the cartridge case, it serves rigidly to support the free end of the anvil so as to eliminate distortion or damage to that part or to the punches during the perforating operation.

As the reciprocatably movable upper plate of our fixture moves downward, the sliding wedge is automatically brought to its anvil supporting position, one straight longitudinal row of holes is perforated, and the slugs resulting from the perforations are blown out of the fixture.

As the upper plate ascends, the sliding wedge is automatically released, and indexing mechanism associated with the fixture is caused to index the cartridge case both in rotary and axial directions. Then, on the next descent of the upper plate, an adjacent longitudinal row of perforations, staggered in relation to the previous row, is produced.

The perforating and intermittent indexing operations continue automatically until the cartridge case has made one complete revolution, at which time the operation is complete and the fixture's action is automatically stopped. After removal of the perforated cartridge case and insertion of another to be perforated, the operation is repeated.

As will be explained in detail later, our fixture is provided with a safety device which also automatically stops the fixture's operation should proper indexing of the cartridge case not take place.

One object of our invention is to provide an automatically indexable perforating fixture for hollow, tapered cylindrical objects.

Another object is to provide a perforating fixture of the character mentioned, in which the anvil is rigidly supported from below during the perforating operation.

A still further object is to provide a perforating fixture equipped with automatically operating safety devices to stop the machine at the completion of its cycle, or at the failure of the indexing mechanism to operate properly.

Yet another object is to provide a perforating fixture incorporating a quickly applied and removed work clamping device.

The foregoing and other objects and advantages of our invention will become apparent from an inspection of the following description and the accompanying drawings wherein:

Fig. 2 is a top plan view, partly in section and partly broken away, taken along line 2—2 of Fig. 1 to show the appearance of the lower fixed member of our fixture and the parts attached thereto;

Fig. 3 is a similar view, partly broken away, taken along line 3—3 of Fig. 1 and showing the appearance, from above, of the upper reciprocatable member of our fixture and the parts attached to its lower surface;

Fig. 4 is a vertical section taken along line 4—4 of Fig. 2 and showing, in particular, certain internal details of the fixture's anvil, and the manner of supporting the anvil, guide rails, and draw bar;

Fig. 5 is a side view of our fixture, partly in section and partly broken away, as seen from line 5—5 of Fig. 1;

Fig. 6 is a vertical section, partly broken away, taken along line 6—6 of Fig. 2 and showing constructional details relating to an overhanging portion of our fixture;

Fig. 7 is a partial horizontal section taken along line 7—7 of Fig. 5 and showing certain details of the fixture's lower plate, anvil support block, guide bar supports, draw bar, plate cams, roller bars, and guide bars. The parts omitted from this section are a repetition of those previously shown, and, for that reason, have been deleted for simplicity of drawing;

Fig. 8 is a horizontal section, partly broken away, taken along line 8—8 of Fig. 5 and showing interior details of the anvil;

Fig. 9 is a partially sectioned and partially broken away front view of our fixture. This figure is actually an enlargement of a corresponding portion of Fig. 1; but for simplicity of drawing, most of the punch press to which the fixture is attached is not shown;

Fig. 10 is a vertical section taken along line 10—10 of Fig. 9 and showing details of a safety switch provided on the fixture;

Fig. 11 is a horizontal section taken along line 11—11 of Fig. 9 and showing some details of the fixture's indexing mechanism;

Fig. 12 is a vertical section taken along line 12—12 of Fig. 9 and showing more details of the indexing mechanism together with means provided for clamping the head end of the cartridge case in the fixture's chuck. For simplicity of drawing only one of a plurality of clamp lugs is shown in the case clamping means;

Fig. 13 is a vertical section taken along line 13—13 of Fig. 9 and showing additional details of the safety switch;

Fig. 14 is a partly broken away vertical section taken along line 14—14 of Fig. 12 and showing additional details of the case clamping means;

Fig. 15 is a central vertical section, partially broken away, showing the manner of positioning and clamping the cartridge case in the fixture's chuck. Also shown are details of the anvil, die block, sliding wedge, anvil support block, and cradle;

Fig. 16 is a vertical section taken along line 16—16 of Fig. 15 and showing additional details of the fixture's cradle, sliding wedge, anvil, and die block;

Fig. 17 is a side view taken along line 17—17 of Fig. 1 and showing the automatic clutch release mechanism associated with our fixture. In this figure the machine's clutch would be engaged;

Fig. 18 is a side view taken along line 18—18 of Fig. 1 and showing a treadle controlled switch forming part of the safety mechanism already mentioned. In this figure the machine's clutch would be disengaged;

Fig. 19 is a partly broken away front view similar to Fig. 9 but showing a modified structure of the clamping and indexing mechanism of our fixture;

Fig. 20 is a horizontal section taken along line 20—20 of Fig. 19 and showing additional details of a portion of the modified indexing mechanism;

Fig. 21 is a horizontal section taken along line 21—21 of Fig. 19 and showing a certain eccentricity upon which the axial indexing in the modified structure is dependent;

Fig. 25 is a detail view of an element.

Fig. 26 is a wiring diagram of the electric circuits.

Fig. 27 is an enlarged detail view of an element 90 of Fig. 12.

As seen in Figs. 1 to 3, 5, 9, and 12 our inventive fixture is constructed upon a die set comprising a base plate 31 and an upper, opposed companion plate 32. Secured in the lower plate by well known means (not shown) and extending vertically upward toward the companion plate are guide posts 33. These guide posts are slidably accommodated in bushings 34 secured in usual fashion (not shown) in the companion plate and serve to maintain alignment between the two plates.

Figure 1:
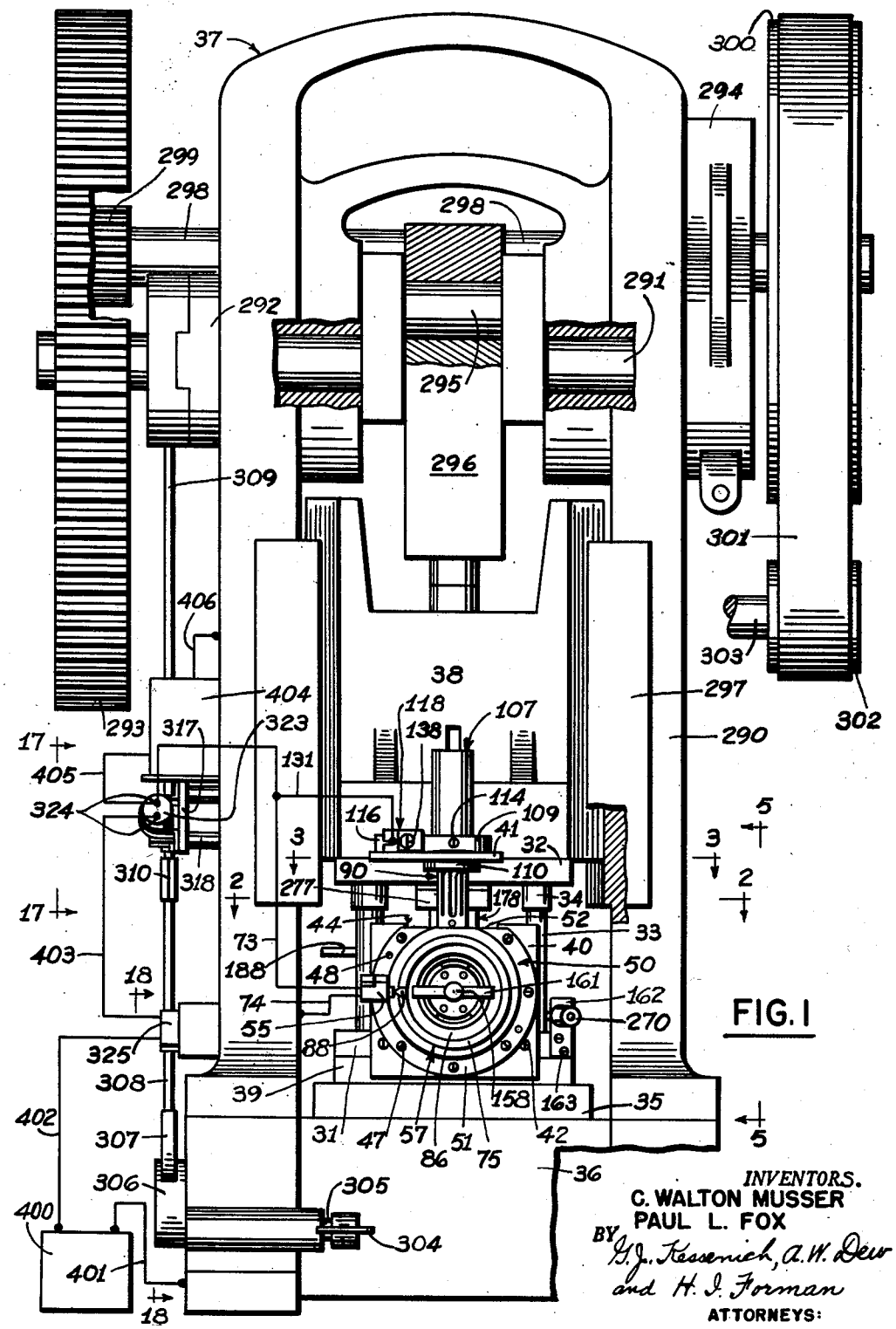
Fig. 1 is a front view of our invention shown mounted upon a representative punch press which is shown partly in section and partly broken away.

In practice, as is well known by those skilled in the art, base plate 31 is secured in any convenient manner (not shown) to a bolster plate 35 forming part of bed 36 of a punch press type machine tool 37, while upper, companion plate 32 is secured, in alignment with the base plate, to the press's reciprocating ram 38 (see Fig. 1). For facility of purpose, a spacer plate 39 is shown interposed between the base plate and the bolster plate; but, depending upon press dimensions and other factors, the bolster plate and spacer plate may not always be necessary and could, therefore, be omitted.

As the machine is operated, the reciprocating ram carries the companion plate toward and away from the fixed base plate. More details concerning the machine tool to which our fixture is attached will be given later.

In order to facilitate the understanding of our fixture and its operation, our description will be presented according to the following pattern. First we shall describe the front end construction of our fixture, i. e. the portion embracing the rotary and axial indexing mechanism in addition to the means provided for locating and clamping in the fixture the head end of the cartridge case to be perforated (see Fig. 12). Next we will describe the components associated with the fixture's base plate 31; then those attached to its upper, companion plate 32. After that we shall discuss the illustrative punch press on which our fixture is used and the press's fixture operated, clutch release mechanism. Following that, the operation of our fixture will be presented; then, finally, the construction and operation of a modified construction of the fixture.

The front end of our fixture is viewed externally in Figs. 1, 2, 3, 5, and 9, and is sectioned in Fig. 12. This front end, which houses the rotary and axial indexing mechanism, also contains automatic safety switches. In addition, as will be shown later, the head end of the cartridge case to be perforated is located and clamped in the front end. From the figures mentioned, it can be seen that some components of the fixture's front end construction are associated with fixed base plate 31 through a vertical plate 40 attached thereto, and the remainder of the components are associated with reciprocated companion plate 32 through an extension plate 41 secured to it.

*Front end components associated with base plate*

VERTICAL PLATE, CYLINDRICAL INDEX HOUSING, AND "MICROSWITCH"

Those components of the fixture's front end which are associated with base plate 31 will now be discussed. As seen in Figs. 1, 9, and 12, vertical plate 40 is secured by means of screws 42 and dowels 43 to one end of base plate 31, and is provided with a stepped U-shaped opening 44 emanating from its upper edge (see Fig. 12). The upper portion 45 of this opening is somewhat wider than the lower portion 46 (see Fig. 2) and is of sufficient width and depth to permit proper movement of a punch block later to be described. Lower portion 46 of the stepped U-shaped opening is of such size to permit free passage of the cartridge case in the loading, operation, and unloading of the fixture (see Figs. 12 and 15).

Attached to vertical plate 40, as by screws 47 and dowels 48, is a hollow, cylindrical index housing 50 (see Figs. 1, 2, 5, 9, and 12). That portion of the index housing adjacent the vertical plate is provided with a flange 51 through which pass the screws and dowels which secure the housing to the vertical plate. As seen in those figures the upper portion of the housing is flattened off as at 52 for a purpose which will become apparent later. As seen in Figs. 1, 2, and 9 the left side of housing 50 is also flattened off as at 53 and has attached thereto, as by screws (not shown), a bracket 54 upon which is mounted a "Microswitch" 55 later to be described. In Figs. 2 and 9 can be seen the electrical lead wires 73 and 74 which emanate from this microswitch and form part of the electrical system of our fixture. The operation of this electrical system will be discussed in its entirety later.

RING GEAR, WEAR PLATE, AND CHUCK PINS

As will be seen in Figure 12, the index housing has a series of concentric recesses. One central recess 56 accommodates a rotatable, axially slidable chuck 57, later to be described. Another recess 58 rotatably accommodates the flange 59 of a bevel ring gear 60 and a third recess 61 contains a wear plate 62. In the central portion of flat 52 the housing's wall accommodates a bushing 63 which is secured in place by set screw 64. Near its forward end (i. e. toward the reader's left in Figs. 5 and 12), this wall is also provided with three strategically located, radially extending, stepped recesses. Each recess contains, at its inner end, a bushing 65 and, at its outer end, a threaded plug 66 (also see Figs. 9 and 12). Each bushing, in turn, accommodates a headed chuck pin 69 (see Figs. 9 and 12) which extends somewhat inside recess 56 for a purpose which will be explained later.

Wear plate 62 is a flat disc accommodated in recess 61 of index housing 50. Its thickness is such that the plate's outer face is substantially flush with the adjacent face of the index housing. A central recess 67 in the wear plate slidably and rotatably accommodates the inner end 68 of chuck 57 (see Figs. 5, 9, 12, and 15).

Bevel ring gear 60 is composed of the toothed portion 70 and the earlier mentioned flanged portion 59 (see Figs. 5, 9, and 12). The flanged portion is rotatably accommodated in shouldered recess 58 in index housing 50 where it is confined against axial movement by wear plate 62. The gear's inside diameter slidably accommodates the inner end 68 of chuck 57 and is provided with oppositely located key grooves 72.

CHUCK AND SWITCH LUG

The cylindrical, rotatable, and axially slidable chuck 57 is shown in Figs. 1, 2, 5, 9, 12, 14, and 15. Fig. 12, in particular, shows our chuck to consist of a large diametered outer end 75 (to the reader's left in that figure), a smaller diametered intermediate portion 76, and the previously mentioned inner end 68 (to the reader's right in Fig. 12). A uniformly undulating peripheral groove 77 (see Figs. 5 and 12), having the same number of undulations as there are longitudinal rows of perforations to be produced in the workpiece, is located in the large diametered portion 75, and oppositely located keys 78 are positioned in smaller diametered portion 68. As will be seen later, the undulating groove, in collaboration with chuck pins 69, is responsible for the intermittent axial indexing of the workpiece in our fixture. In other words, the cooperation of these parts results in the staggered relationship between the perforations produced in the workpiece. Those skilled in mechanical arts know that actually only one chuck pin engaged in the undulating groove of the chuck would produce the desired axial displacement of the chuck. However, for facility of operation, we have provided the three chuck pins, although any convenient number could be employed. From Figs. 12, 14, and 15 it can be seen that keys 78, which mate with key grooves 72 in bevel ring gear 60, prevent relative rotation between those parts, but yet do not prevent chuck 57 from axially sliding in relation to the bevel ring gear.

The inside of our chuck contains a recess 80 which has the bottom 81. The bottom, in turn, is provided with a central opening 82 which accommodates a portion of the head of the cartridge case to be perforated. At the opposite end of recess 80, three equally spaced lugs 83 having arcuate faces 84 (see Fig. 9) project radially inward. As will be shown later, these lugs aid in clamping the cartridge case in position.

Press fitted in clamp recess 80, just inside the inner surface of clamp lugs 83, and approximately at the end of one of the clamp lugs (in traveling clockwise as viewed from the fixture's front end), is a stop pin 85 (see Figs. 9 and 14). As will be shown later this stop pin aids in properly positioning a cartridge case clamp.

Secured to the front face of chuck 57 by means of screw 87 is a switch lug 88 (see Figs. 1, 2, and 9). During the operation of our fixture this lug intermittently contacts and depresses button 89 of "Microswitch" 55 controlling an electrical circuit associated with our fixture. More details about these matters will follow later.

Leading into recess 80 from its left end (see Fig. 12) is the tapered throat 86 through which, in addition to recess 80, the cartridge case is inserted and removed from our fixture.

INDEXING SPINDLE AND PINION GEAR

Resting upon flat portion 52 of index housing 50 is the indexing spindle 90 (see Figs. 1, 2, 5, 9, 11, and 12). The periphery of this spindle is provided with seven equally spaced, cam-like grooves, the major part of which consists of an axially extending, straight portion 91. Each groove has, at its upper end, a deep portion 92 and, at its lower end, a less deep portion 93 (see Fig. 12). Connecting these two portions is a beveled portion 94, a shallow portion 95 and a shoulder 96. Extending from the less deep portion 93 of one groove to the deep portion 92 of the adjacent groove in a counterclockwise direction (as viewed from above) is a steep-pitched helical groove 97. The significance of these parts will be elaborated upon later. However, it should be mentioned that seven such equally spaced grooves 91 were chosen only in order to co-function properly with the gear ratio between a pinion gear 102, later to be introduced, and the earlier mentioned bevel ring gear 60. In other words, the number of grooves may be varied provided that rotation of the indexing spindle through a distance equal to the angular spacing between its grooves 91 produces a given angular rotation of chuck 57, in order to accomplish the proper angular spacing between successive, longitudinal rows of perforations to be made in the workpiece.

From Fig. 12 it can be seen that indexing spindle 90 is pinned as at 100 to the shank 101 of a beveled pinion gear 102. This pinion gear is provided with a thrust collar 103 which bears against the inside face of bushing 63 earlier mentioned. It can be seen that rotation of indexing spindle 90 will result in rotation of bevel pinion 102, bevel ring gear 60, and chuck 57.

Intermittent rotation of indexing spindle 90 (see Figs. 1, 2, 5, 9, 11, and 12) results from reciprocation of companion plate 32 which is attached to the well known punch press type machine, and is brought about through the aid of components now to be introduced.

Front end components associated with companion plate

EXTENSION PLATE THIMBLE

Attached to the upper surface of companion plate 32 as by screws 105 and dowels 106 (see Figs. 3, 5, and 12) and projecting horizontally outward over index housing 50 is extension plate 41 (also see Figs. 1, 9, 10, 11, and 13). Axially aligned with indexing spindle 90 and rotatably supported in a recess in the extension plate is thimble 107 whose internal recess 108 slidably and rotatably accommodates indexing spindle 90. Thimble 107 has a flange 109 near its lower end which rests atop extension plate 41, and the thimble is prevented from axial movement out of the extension plate by means of a collar 110 which is threadedly attached to the thimble's lower end and secured by means of set screw 111 (see Figs. 5 and 9).

The thimble's flange 109 is provided with three stepped, radially extending recesses in which are located an indexing pin 112, a pin spring 113, and a threaded plug 114 (see Figs. 11 and 12). From those figures it is obvious that index pin 112 engages grooves 91 and 97 in indexing spindle 90, and is constantly urged radially inward toward the indexing spindle by means of the spring 113. As in the case of chuck pins 69, one index pin 112 engaged with the indexing spindle 90 would, theoretically, be sufficient for the operation of our fixture. Our use of three index pins acting in unison is made as a mechanical expedient in order to facilitate the fixture's operation. Also provided on the flange is an axially extending, semi-circular groove 115 (see Figs. 3 and 11). We would like to point out, however, that, if desired, the thimble's flange may be provided with the same number of grooves 115 as there are grooves 91 in indexing spindle 90. The purpose of groove 115 will be explained later during the description of allied components.

PAWL, BACK-STOP, AND ALLIED "MICROSWITCH"

As best shown in Fig. 3, extension plate 41 also has attached to it a pawl 116, a back-stop 117, and a "Microswitch" 118. The pawl is pivotally secured to the extension plate by means of the shoulder screw 119. The opposite end of pawl 116 is shaped as at 120 to engage the vertically extending, semi-circular groove 115 in the thimble's flange 109. Back-stop 117 is secured to extension plate 41 by means of screws 121 and is placed in abutment with the rearward lateral surface of pawl 116. This back-stop is so positioned that, in the Fig. 3 showing, an imaginary line between pivot 119 and the axial center of thimble 107 would pass through the center of shaped end 120 of pawl 116. It is evident from Fig. 3 that thimble 107 cannot rotate in a clockwise direction because of the engagement between the pawl's shaped end 120 and semi-circular groove 115 in the thimble's flange. It can also be understood that counterclockwise rotation of the indexing spindle will cause the pawl to pivot away from back-stop 117. This action will be discussed in more detail later.

Microswitch 118 (see Fig. 3) is secured atop extension plate 41 by means of screws 122. In the left portion of the microswitch is an insulating sleeve 125 (see Fig. 10). This sleeve extends substantially perpendicular to the lateral surface of the pawl and contains, within an axial, shouldered recess at its inner end, a contact pin 126 having a head 127. At the opposite end of the insulating sleeve, a terminal stud 128 is threadedly attached thereto. Confined between the inner end of the terminal stud and the head of contact pin 126 is a contact pin spring 129. This spring, by acting upon the head of the contact pin, constantly urges that pin toward pawl 116. When the contact pin is fully extended from the insulating sleeve a very small space 130 exists between the end of the pin and the pawl (see Figs. 3 and 10). Those figures also show that an electrical lead wire 131 is secured to terminal stud 128 by means of terminal nut 132. Later in our description we will deal with the electrical aspects of our fixture.

Microswitch 118 also accommodates a plunger 135 having the head 136 which is slidably positioned in shouldered recess 137 (see Fig. 13). Opposite plunger 135 is a plug 138 which is threadedly attached to the outer end of recess 137. Confined between plug 138 and the head of plunger 135 is a coil spring 139 which acts constantly through the plunger to push pawl 116 against back-stop 117.

From the description of these parts it is apparent that the thimble may, under conditions to be described later, rotate in a counterclockwise direction as viewed from above. If this rotation takes place, pawl 116 will be rotated until it abuts contact pin 126. This action will complete an electrical circuit which results in practically instantaneous stopping of the fixture's action, as will be described later.

Cartridge case clamp

The cartridge case to be perforated by our novel apparatus is secured in chuck 57 by means of a clamp which will now be described.

As shown in Fig. 12, this clamp is composed of a circular body portion 140 from which projects an axial shank portion 141 having the threaded end 142. A central cavity 143 in the body portion slidably accommodates a plug 144. Extending radially outward from the central cavity are three equally spaced recesses 145 (also see Fig. 14). These recesses are comprised of an outer, flat bottomed portion 146 perpendicular to the clamp's axis, and an inner sloped portion 147. In each recess a floating clamp lug 148 is provided. (The lugs are all shown in Fig. 14, but in Fig. 12 only one lug is shown in order to simplify the drawing.) Each lug has a rounded protuberance 149, an outer, heel portion 150, and an inner, toe portion 151. The heel portion rests upon flat portion 146 of the recesses 145. Protuberance 149 projects somewhat outside the clamp's body portion, and toe portion 151 is radially shaped (see Figs. 12 and 14) so as properly to nest together during operation of the clamp. The toe portion also is in contact with plug 144.

Covering the inner end of clamp body 140 is a cover plate 152. This cover plate is the same shape but slightly smaller than the clamp body (see Figs. 12 and 15) and is secured in position on the body by means of screws 153. Recesses 154 are provided in the cover plate for slidably accommodating the floating clamp lugs; however, these recesses are not of sufficient size to allow the lugs to fall out of the clamp body. Attached to a shallow, axial recess in plate 152 to which it is secured by means of a screw 155, and projecting away from the clamp's body is a spherical nosed pilot 156 whose purpose will be explained later.

From the foregoing, it can be seen that if the plug 144 is moved in or out, pressure on clamp lugs 148 will vary accordingly. This movement of plug 144 is caused by the movement of a push rod 157 slidably accommodated within shank portion 141 of the clamp's body. The rod is pushed to the reader's right to apply clamping pressure by threading a cap 158 onto the shank. The clamping pressure is released by unthreading cap 158 from the shank.

From Fig. 14 it can be seen that three equally spaced clamp lugs 160 project from the periphery of clamp body 140. The radial distance over these lugs is slightly less than the diameter of recess 89 in chuck 57 to allow sliding relationship between the two parts; and the radius of body portion 140 of the clamp is slightly less than the radius across clamp lugs 83 in recess 89 of the chuck to also permit a sliding relationship between these two parts. As is necessary for the removal and insertion of our clamp in relation to chuck 57, we have made the clamp so that its lugs 160 will fit in the space between the clamp lugs 83 on the chuck. In order to reduce the weight of the clamp, we have provided the lightening holes 159 in its body.

Threading and unthreading of cap 158 on shank portion 141 is facilitated by means of cross piece 161 secured in any convenient manner in the cap.

Other components associated with base plate

Having described the intermittent rotary and axial indexing mechanism which is associated with both base plate 31 and companion plate 32, and having described the means for clamping the cartridge case to be perforated into our fixture, it now seems in order to discuss other components associated with the base plate.

In Figs. 1, 2, 5, and 9 can be seen a bar 162 which is fastened by means of screws 163 to the front face of base plate 31. This bar contains an opening (not shown) which slidably supports one end of a wedge operating rod 164 later to be described.

CRADLE, ANVIL SUPPORT BLOCK, AND AIR VALVE

On the top surface of base plate 31 near its front end and approximately midway between its sides is a cradle 165 which is secured in place by means of screws 166 and dowels 167 (see Figs. 2, 5, 12, 15, and 16). For a reason which will become apparent later, the cradle's top surface bears a longitudinally extending, tapered concavity 168. This concavity is concentric with the axis of chuck 57, and conforms to a portion of the sidewall of the cartridge case to be perforated in our fixture.

Farther back on the base plate's top surface, and in alignment with cradle 165, is an anvil support block 170 (see Figs. 2, 4, 5, 7, 8, and 15). As shown in Figures 2 and 7, this block consists of a large forward portion 171 and a narrower, stepped down rear portion 172. Extending longitudinally across the block's top surface is a horizontal groove 173 which accommodates an anvil 174 later to be described (see Fig. 4). Cut into the bottom of the horizontal groove is a somewhat narrower, longitudinally extending groove 175 (see Figs. 4 and 7) which slopes downward from front to rear. This groove slidably accommodates a draw bar 176 which also will be described later. The narrower, stepped down rear portion 172 of the anvil support block contains, on each side thereof, a vertically extending groove 177 which slidably accommodates the plate cams 178 attached to companion plate 32 (see Fig. 7). Also shown in that figure is a recess 169 in base plate 31 and spacer plate 39. This recess is aligned with the plate cam grooves in the anvil support block, and provides space for the travel of the plate cams. As shown in Figs. 4 and 5 the top surface of anvil 174 is substantially coplanar with the top surface of the large forward portion 171 of the anvil support block. Upon this surface a top plate 179 and interposed gasket 180 are placed. This assemblage of anvil support block, gasket, and top plate is held together and secured to base plate 31 by means of screws 181 and dowels 182 (see Fig. 2) which transfix those parts and thread into the base plate. In order to slidably accommodate the neck end of the cartridge case to be perforated in our fixture, the front surface of this assemblage is provided with a recess 189 (see Fig. 15).

In Figs. 2, 4, and 5 can be seen an air valve 183 which is threadedly attached to the central portion of top plate 179. In the lower, inner surface of the top plate, and in alignment with the outlet 184 of the air valve, is a recess 185 (see Fig. 4). As also seen in that view, gasket 180 contains an opening 186 which is substantially the same size as recess 185. More will be said about the recess and the gasket opening later.

Air valve 183 (see Figs. 2, 4, and 5) contains a release button 187 and an air inlet pipe 188. This pipe connects at its other end to a convenient source of air pressure (not shown).

ANVIL

The anvil in our fixture corresponds to the horn of the well known horn press. The horn, as is familiar to workers in the art, usually amounts to a cantilever beam which fits through an opening to the inside of an otherwise closed workpiece for the purpose of supporting it in the press. However, our anvil as we will show, has many novel features which distinguish it from prior art horns.

Our anvil has a flat, horizontal upper surface 190 and a flat, beveled lower surface 191 (see Figs. 5, 12, 15 and 16). The lower surface slopes away from the upper surface along the anvil's length from front to rear. Extending the length of the anvil is a centrally located, stepped slug recess 192 whose cross sectional area increases from front to rear (see Fig. 8). The forward end 193 of the slug recess is closed by a threaded end plug 194 while the rear end 195 accommodates, as by press fit, the slug outlet fitting 196. As shown in Figs. 2, 5, and 8, a slug outlet conduit 197 is secured, by any convenient means (not shown), to fitting 196.

Extending along the opposite sides of our anvil are air grooves 200 (see Figs. 4, 8, and 15). These air grooves communicate with air inlet holes 201 at the rear end of the anvil and with the slug recess 192 by means of the inclined side ports 202 and end ports 203 at the forward end of the anvil. As seen in Fig. 8, inclined side ports 202 are at an angle directed to the rear end of slug recess 192 for a reason to be explained later. Air inlet holes 201, as Fig. 4 shows, communicate with recesses 185 and 186 in top plate 179 and gasket 180, respectively. From this it can be seen that a fluid stream (not shown) from valve 183 will enter the inlet holes, flow along the air grooves, and into a slug recess 192 through the inclined side ports and the end ports. From the slug recess, the fluid stream flows past slug outlet fitting 196 and along slug conduit 197. Air grooves 200 are sealed by closure strips 205 which are compressed or otherwise secured in leakproof fashion into shallow grooves 206 which encompass the periphery of the air grooves.

DIE BLOCK AND DIES

Located in a groove 207 in the top surface 190 of the anvil, and secured there by screws 208, is a die block 209 whose upper surface 210 is shaped to coincide with a portion of the cartridge case's interior (see Figs. 2, 15, and 16). The die block is provided with shouldered recesses 211 which accommodate the dies 212. These shouldered recesses are in alignment with an equal number of recesses 213 of the same diameter in anvil 174, and form a path along which slugs resulting from the perforating operation travel from the dies to slug recess 192.

Each die 212 contains a punch mating recess 214 and a coaxial slug clearance recess 215 which is substantially congruous with the smaller part of die recesses 211 in the die block and recesses 213 in the anvil. In Figs. 15 and 16 it can be seen that the outer surface of the die is shaped to conform with the upper surface of the die block.

Located on each side of the anvil near its forward end, and secured by screws 216, is an L-shaped hanger plate 217. These hanger plates are placed so that the lower ends which extend beyond the anvil's lower surface turn inward (see Fig. 16).

The anvil's rear end is accommodated in groove 173 in anvil support block 170 to which it is pinned by means of pin 218 which transfixes top plate 179, gasket 180, and the support block (see Fig. 2).

WEDGE AND DRAW BAR

In sliding contact with the anvil's lower surface 191 is a wedge 220 whose lower surface 221 is shaped, similarly to the upper surface of die block 209, to engage a portion of the inside of the cartridge case (see Fig. 15). On each side of the wedge near its upper surface is a groove 222 which engages the inturned lower ends of hanger plates 217 attached to the anvil.

It will be noted from Fig. 15 that if wedge 220 be moved toward the front of the fixture (toward the reader's left in that figure), the overall height over the upper surface 210 of the die block and lower surface 221 of the wedge decreases. Conversely, if wedge 220 be moved toward the rear of the fixture (toward the reader's right) the overall dimension over die block and wedge increases. It will later be shown how this action permits the hollow, tapered, cylindrical workpiece to be inserted and removed from our fixture, and how it exerts and releases clamping pressure upon the sidewall of the workpiece.

The rear portion of the wedge is stepped down as at 225 and to this portion draw bar 176 is secured by means of screws 226 (see Fig. 15). The draw bar comprises a wide, front portion 227 and a narrower, rear portion 228. On each side of the wide portion, and in alignment with the wedge's groove 222, is a similar groove 229. This groove, like the wedge's groove, is dimensioned slidably to accommodate the lower inturned ends of L-shaped hanger plates 217. The draw bar extends through groove 175 in anvil support block 170 to a rearwardly extending portion of the fixture which will subsequently be described.

From Figs. 12, 15, and 16, it can be readily seen that when the workpiece is in position, the forward projecting end of anvil 174 is rigidly supported from below by the wedge, wall thickness of the workpiece and the cradle. For this reason, the anvil can withstand the pressure applied to it, when the workpiece is perforated, without distortion to any appreciable degree.

GUIDE BAR SUPPORTS

Abutting the large, forward portion 171 on each side of the anvil support block 170, and secured to base plate 31 by means of screws 230 and dowels 231 are the oppositely located guide bar supports 232 (see Figs. 2, 4, 5, and 7). These supports are identical except that one is on the left side and the other is on the right. Therefore, a description of one will suffice for both. Each guide bar support consists of a base portion 233 from which vertically projects an upright portion 234. As shown in Figs. 2, 3, 5, and 7, a forward portion 235 of the upright portion is substantially the same height as the large, forward portion 171 of anvil support block 170 against which it abuts. From Figs. 2 and 7 it can be seen that a rear, stepped-in portion 236 of the guide bar support's upright portion lies close to, but does not touch the narrower rear portion 172 of the anvil support block 170. The reason for this condition is that upright portion 234 of the guide bar support contains an inwardly facing groove 237 (see Figs. 2, 4, 5, and 7) which slopes downward from front to rear at the same angle as the underside of anvil 174. This groove, then, is deeper at the rear, stepped-in portion of the guide bar support than it is at the forward portion. As seen in Figs. 2, 4, 5, and 7 the forward end of a guide bar 240, later to be described, is supported by the full length of this groove, while the forward end of a roller bar 241, also to be described later, is slidably supported only in the deeper portion of the groove.

*Components overhanging base plate*

THE GUIDE BARS

As seen in Figs. 2 and 5 some parts of our fixture overhang the rear end of base plate 31. This overhanging structure is founded upon guide bars 240 which extend rearwardly and downwardly from the forward face of anvil support block 170. The front end of each guide bar is supported in groove 237 in guide bar support 232 located on each side of the anvil support block 170 (see Figs. 2 and 4). As earlier mentioned, these guide bar supports are secured to base plate 31 by means of screws 230 and dowels 231 (see Fig. 2). Passing through the side of these supports, through the guide bars, and threading into the anvil support block are screws 242 (see Fig. 5) which thus secure the guide bars at their forward ends. The rear ends of the guide bars are tied together by means of plate 245 (see Figs. 2, 5, and 6) to which they are secured as by screws (not shown).

ROLLER BARS, YOKE, AND LATCH

Immediately adjacent the inner surface of each guide bar is the somewhat shorter roller bar 241 (see Figs. 2, 5, 6, and 7). These bars are slidably supported at their front ends by rear portion 236 of guide bar supports 232. At their rear ends they are slidably supported by plate 245. As seen in Figs. 2, 5, and 6, a yoke 246 spans the space between the roller bars and is joined to each bar, as by screws or other convenient connection (not shown). Near the forward end of each roller bar is a pin 247 upon which a roller 248 is rotatably mounted (see Fig. 7).

Located in an opening in the central portion of yoke 246 is the latch 250 (see Figs. 2, 5, and 6). This latch has a square shaped flange section 251 which abuts the inner face of the yoke. Projecting rearwardly from the flange section is a threaded shank 252, while projecting forwardly is the keeper portion 253.

A coil spring 254 fits around the threaded shank (see Figs. 2 and 5) and is confined between yoke 246 and a nut 255 so as constantly to pull flange portion 251 against the yoke. Nut 255 is held in adjustment by lock nut 256.

SADDLE, JAWS, AND JAW LEVER

Slidably resting upon roller bars 241 and guide bars 240 is a saddle 257 having a web 258 (see Figs. 2 and 6). Each side of the saddle has a groove 259 by means of which it slidably rests upon the adjacent roller and guide bars. The web portion of the saddle is somewhat stepped down from the saddle's side portions and contains a forwardly projecting tab 327 (see Fig. 2) to which the rear end of draw bar 176 is adjustably attached by means of screws 328 which pass through a slot 329 in the draw bar. Threadedly attached to web 258 is a pivot 260 about which hooked jaws 261 are free to rotate in scissor fashion. These jaws are acted upon by the springs 262 secured in any convenient manner to the saddle so as constantly to urge the jaws toward each other.

Pivotally secured atop saddle 257 by means of shoulder screw 263 is the jaw lever 264 (see Figs. 2, 5, and 6). The pivoted movement back and forth of the jaw lever is limited by forward and rear stop pins 265 and 266, respectively, which are secured in any convenient manner to the top of saddle 257. Projecting downward from the lower surface of jaw lever 264 is the jaw spreading stud 267. When the jaw lever is in its rearward position (see Fig. 2), the axis of the jaw spreading stud is substantially in alignment with the apex (not shown) formed by the two converging sides of jaws 261.

WEDGE OPERATING ROD

Attached to the underside of the free end of jaw lever 264, as by screws 268, and extending downward from its lower surface, is the end block 269 (see Figs. 2 and 5). This block is provided with a recess through which passes the rear end of wedge operating rod 164.

The wedge operating rod is slidably supported at its front end by support bar 162 through which it passes. Secured to the forward end of the wedge operating rod by any convenient means (not shown) is a handle 270. The rear end of the wedge operating rod is provided with an adjusting nut 271 which is maintained in position by means of lock nut 272. Intermediate its ends, wedge operating rod 164 is equipped with adjustably slidable, forward and rear stop collars 273 and 274, respectively. The forward collar 273 limits the forward sliding movement of the wedge operating rod, while rear collar 274 assists in imparting movement of wedge operating rod to jaw lever 264.

In connection with the wedge operating rod 164, saddle 257, and jaw lever 264, attention is drawn to the following facts. Starting with those parts in the Fig. 2 position, when the wedge operating rod is moved outward by pulling on its handle 270, the jaw lever is pivoted toward the front of the fixture. This movement of the jaw lever causes jaw spreading stud 267 to separate jaws 261 about their pivot 260 until they become disengaged from the latch's keeper portion 253. By the time the jaws are unlatched, the jaw lever contacts the saddle's forward stop pin 265. Continued pulling on the handle causes the saddle to slide forward on guide bars 240. The sliding of the saddle, in turn, moves forward draw bar 176 and its attached wedge 220. The wedge operating rod can be pulled outward until its forward stop collar 273 abuts support bar 162. At that time, the wedge has been moved forward until the overall dimension over the top of die block 209 and the lower side of the wedge is adequate to allow insertion and removal of the workpiece.

As the wedge operating rod is pushed back toward the rear of the fixture, these actions take place. First the wedge operating rod moves in until its rear stop collar 274 abuts the jaw lever's end block 269. As the movement is continued, the jaw lever is pivoted toward the rear of the fixture. This action carries the jaw spreading stud away from the jaws allowing them to close under action of springs 262. However, the jaws have not yet contacted latch 250. The jaw lever pivots until it contacts the saddle's rear stop pin 266. From this point on, the saddle moves toward yoke 246. In so moving, the saddle's jaws contact the latch's keeper portion 253 and are spread apart by the keeper's pointed end. Continued movement of the wedge operating rod returns the jaws back to the Fig. 2 position where they become latched onto the keeper.

*Other components associated with companion plate*

PUNCH BLOCK, PUNCHES, AND PLATE CAMS

In addition to the components already described, companion plate 32 is provided with a punch block 277 (see Figs. 1, 3, 5, 9, and 12) and plate cams 178 (see Figs. 3, 5, 7, and 9). The punch block is secured to the under surface of the companion plate by means of screws 278 and dowels 279 so that the punches 280 secured in the block by any well known means (not shown) are vertically aligned with dies 212 located in die block 209. In accordance with usual practice, a back-up plate 289 is interposed between punch block 277 and companion plate 32.

Plate cams 178 are similar in construction and purpose. Each cam has a horizontal flanged portion 281 and a vertically extending plate portion 282. Cut into the outer face of each plate portion, and extending from the lower end thereof toward the flange portion, is a roller groove 283. This groove has a forward vertical portion 284 and a rear vertical portion 285 which are connected by a sloped portion 286. One plate cam is mounted upon the underside of the companion plate above each side of anvil support block 176 by means of screws 287 and dowels 288 (see Fig. 3), so that the plate portion of each cam slidingly mates in accommodating groove 177 on each side of the anvil support block (see Fig. 7).

*Illustrative punch press equipped with electrical clutch release*

Our fixture is intended to be used on a machine of the punch press variety as illustratively shown in Fig. 1. Because the manner of construction and operation of this type of machine is well known to those skilled in the art, and since the machine represented is merely illustrative of wide variety, only the essential parts thereof will be identified. From Fig. 1 it can be seen that such a machine may have a bed 36 to which is attached, in well known manner, a frame 290. Located in the upper part of the frame, and extending thereacross is a crankshaft 291. This crankshaft projects beyond the sides of the frame, and, at one end, is provided with a clutch mechanism schematically shown at 292 and a drive gear 293. The opposite end of crankshaft 291 is equipped with a brake mechanism of usual construction which is enclosed by casing 294. In the central portion of the crankshaft is the crankpin 295 to which is attached the connecting rod 296. At the lower end of the connecting rod is the press's ram 38 which is reciprocally movable, due to the crankshaft's rotation, in guides 297 which form part of frame 290.

Also located in the upper portion of frame 290, and extending thereacross, is the jackshaft 298 which is provided at one end with a drive pinion 299 meshing with drive gear 293, and at the other end with a flywheel 300. This flywheel is connected in any convenient manner, as by flexible coupling 301 to the motor pulley 302 located on motor shaft 303.

A treadle lever 304 is located in the machine's bed upon a rotatable treadle shaft 305, and by means of a yoked link 306, a connecting link 307, clutch bars 308 and 309 controls the action of the clutch in a well known manner.

However, in order to attain better and safer operation of our novel perforating fixture, we have, by novel means now to be described, adapted the operation of the machine to be controlled by operation of the fixture.

In Figs. 1 and 17 it can be seen that clutch bars 308 and 309 are adjustably coupled together by means of a split clamp block 310 which is secured together by means of threaded fastenings 311 (see Fig. 17). As there shown, the upper end of clutch bar 308 has secured to it, in any convenient manner, a block 312 carrying a somewhat saw-toothed notch 313.

Mating with this notch, when the clutch is engaged, is a similarly shaped projection 314 carried by a clutch detent 315. This clutch detent is pivotally mounted, as by screws 316 to a plate 317 which is offset somewhat from one side of the frame by means of spacers 318 (see Fig. 1), and secured in place by means of screws 319.

Opposite its pivoting end, the clutch detent has an L-shaped link 320 attached to it by means of through bolt 321 (see Fig. 17) and nut (not shown). The other end of link 320 is connected to the plunger 322 of a conventional solenoid 323 having terminals 324. This plunger is normally urged out of the solenoid by means of a spring 339 (see Fig. 17) so that the detent tends toward block 308 on the lower clutch lever.

From Fig. 17 it can be seen that clutch bars 308 and 309 will be held in their downward, clutch-engaged position by means of detent 315 while the solenoid plunger is in its outer position. When, for a reason to be explained later, the electrical circuit to the solenoid is completed, plunger 322 will be withdrawn into the solenoid. This pull on the solenoid is transmitted through link 320 to detent 315 which is then pivoted about screw 316 so that lug 314 becomes disengaged from notch 313. This unlatching action permits clutch bars 308 and 309 to be moved, by well known means forming part of the clutch mechanism, to the upward or clutch-released position. When the clutch is thus disengaged, the action of the press's ram is arrested.

The remainder of the electrical accessories of our fixture are best shown in Fig. 1. As a source of electrical potential we provide a storage battery 400. One terminal of the battery is grounded to press 37 by means of a lead 401, and the other terminal is connected to a "Microswitch" 325 through a lead 402. From the microswitch 325 another lead 403 connects to one side of solenoid 323. The other side of the solenoid is connected to one side of a condenser 404 by means of a lead 405, and to "Microswitch" 55 by means of its lead 73. The condenser's other side is grounded to the press's frame 290 through a lead 406. Fig. 1 also shows that lead 131, which is connected to "Microswitch" 118, also is connected to the solenoid by virtue of that lead's junction with lead 73 from "Microswitch" 55.

The other lead 74 from "Microswitch" 55 is grounded to press frame 290.

As will be shown later, "Microswitch" 325, whose operation is controlled by movement of treadle 304, has main control over the electrical circuit. As a result solenoid 323, condenser 404, and "Microswitches" 55 and 118 are incapable of action unless the press's treadle is depressed to cause engagement of clutch 292.

*Operation of our perforating fixture*

Before describing the operation of our fixture, let up point out that wedge 220 is movable by either one of two different means. As we will show later, reciprocation of companion plate 32 causes sliding movement of the wedge through the aid of plate cams 178, rollers 248, roller bars 241, yoke 246, latch 250, jaws 261, saddle 257, and draw bar 176. Actually, as the companion plate descends, the wedge is moved away from chuck 57; and as the plate rises, the wedge is moved toward the chuck. The wedge 220 is also movable toward or away from the fixture's chuck by means of wedge operating rod 164. When the rod is pushed manually by means of handle 270 attached thereto (see Figs. 1 to 5 and 9), toward the rear of the fixture, the wedge is moved away from the chuck. Conversely, when the rod is pulled away from the rear of the fixture, the wedge is moved toward the chuck.

In describing the operation of our fixture, we shall assume it to be mounted in the illustrative punch press 37 depicted in Fig. 1. The press's ram 37 is at the upper limit of travel, so base plate 31 and companion plate 32 are separated the maximum amount. This relationship between the base plate and the companion plate also places thimble 107 at the top portion of index spindle 90 (see Figs. 1, 5, 9, and 12). Rollers 248 at the same time are in the lower forward portion 284 of roller groove 283 (see Fig. 7) so that through mechanism earlier mentioned wedge 220 is in its forward position.

It is further assumed that wedge operating rod 164 is in its rear position shown in Figs. 1, 5, 9 at which time rear stop collar 274 has, by pushing against end block 269 on jaw lever 264, moved the jaw lever against rear stop pin 266. This pressure against the rear stop pin causes saddle 257 to assume its rearmost position which results in latching engagement between jaws 261 and keeper 253.

For facility of explanation and understanding it is also initially assumed that switch lug 88 on chuck 57 is depressing button 89 of switch 55. Chuck 57 will also be assumed to be in its inward position (see Figs. 2, 5, 12, and 15).

One final assumption is that the cartridge case clamp has been removed to permit insertion of a workpiece to be perforated. In order to load our perforating fixture, wedge operating rod 164 is manually pulled forwardly from the front of fixture until forward step collar 273 thereon abuts bar support 162. By so pulling on wedge operating rod 164, the wedge will be caused to slide forward so that the workpiece can be inserted into our fixture.

Our workpiece, which is in the form of a hollow, tapered, cylindrical cartridge case 409 having a head end 410 and an open, neck end 411, is then inserted neck end first into chuck 57 as far as it will go. The clamp is next placed in the chuck and tightened, thereby clamping the cartridge case in the chuck (see Figs. 12 and 15).

When the cartridge case is properly positioned, its neck and is slidably accommodated in recess 189 formed in the forward end of the assembly of anvil support block 170, gasket 180, and top plate 179 (see Fig. 15). At the same time, a portion of the case's head is slidably supported in recess 82 in chuck 57 (see Figs. 12 and 15). Note also in those figures that the cartridge case is inserted until its head rests upon the bottom 81 of clamp recess 80. When so supported in our fixture, the shaped upper surface of die block 209, and the longitudinal concavity 166 in cradle 165 support opposite portions of the case's sidewall.

The cartridge case is securely positioned in chuck 57 by means of our rapidly operable clamp whose application to the fixture will now be described. Holding the clamp by means of shank 141, clamp body 140 is axially aligned with chuck 57. The body is then rotated slightly until lugs 160 on the body are in alignment with the lug spaces in chuck 57. When these parts are so aligned, clamp body 140 can be pushed into clamp recess 80 in chuck 57 until the projecting lugs 148 about the base of the cartridge case. Clamp body 140 is then rotated in a clockwise direction as viewed in Figs. 1 and 9 by rotating its shank 141 until further rotation is blocked by stop pin 85 which is engaged by one of the clamp's lugs 160.

Threaded cap 158 is next turned in the same clockwise direction causing push rod 157 to move against clamp plug 144. The movement of the clamp plug toward the base of the cartridge case is transmitted to the inner ends of clamp lugs 148. Since the outer end of the lugs rest upon flat portion 146 of clamp recess 145, outward movement of the inner end will result in outward movement of projecting portion 149 of the clamp lug. As these lugs move outward they simultaneously push against the base of the case which, because of its seated position, can move nowhere. As the threaded cap is turned, the clamp body is acted upon by a force which tends to move the body from the chuck. This is prevented by chuck lugs 83, which engage clamp lugs 160, and an axially acting clamping pressure is exerted upon the cartridge case.

The clamping pressure is necessary for two important reasons. First, there must be no relative rotation between cartridge case and chuck 57. Second, there must be no axial end shake between the cartridge case and the chuck lest axial indexing be inaccurate.

With the cartridge case clamped in the chuck, the operation is ready to continue. Treadle 304 is depressed, causing clutch rods 308 and 309 to be moved downward, and thus engage the press's clutch 292 in well known fashion (not shown). As clutch rod 308 is moved downward (see Fig. 18) its lower end (near yoked link 306) is moved toward "Microswitch" 325, depressing its plunger 326 and completing the electrical circuit through the "Microswitch."

When the press's clutch is engaged, crankshaft 291 is caused to rotate in well known manner, thereby causing press ram 37 to descend. As the ram descends, companion plate 32 approaches base plate 31. During the descent of the ram various actions take place. For ease of understanding, these actions will be explained one after the other, although it is to be understood that two or more may occur simultaneously.

At the front end of our fixture, thimble 107 descends on index spindle 90. Pin 112 in the flange of the index spindle housing rides vertically downward in straight index grooves 91. From Fig. 12 it can be seen that in moving down groove 91, index pin 112 is pushed radially outward against spring 113 by means of the sloped portion 94 of the bottom of groove 91. There is then a short duration of travel over the intermediate flat portion 95 of the groove. When that portion is passed, pin 112 is forced radially inward by spring 113 and snaps into the less deep portion 93 of the index spindle. Since these three portions are in vertical alignment, the rotary indexing spindle is not yet rotated.

Farther toward the fixture's rear portion, plate cams 178 attached to companion plate 32 also descend. From Figs. 5 and 7 it can be seen that, as the plate cams descend, roller bars 241 coupled therewith by means of roller 248 are caused to move toward the rear of the fixture. Yoke 246 attached to the ends of the roller bars also moves toward the rear of the fixture carrying latch 250 with it. Since jaws 261 are engaged to the keeper portion of the latch, they, too, are pulled rearwardly along with saddle 257, drawbar 176, and wedge 220. The amount of movement of the roller bars as a result of the action of the plate cams is greater than the amount of available movement of the wedge, because of its confinement within the tapered cartridge case. The wedge, as a result, moves rearwardly only so much as the inside of the cartridge case allows. The difference in the amount of movement between the roller bars and the wedge takes place between the latch and the yoke. The sliding motion between these two parts causes compression of coil spring 254 (see Fig. 2).

From Fig. 15 it can be seen that the free, forward end of anvil 174 is rigidly supported through the cooperation of the wedge, the wall thickness of the cartridge case, and the cradle when the wedge is in its rearmost position. In addition, the wedge exerts an appreciable clamping effect upon the cartridge case.

After the wedge has been moved to its rearmost position by means just described, punches 280 are brought against and through the wall of the cartridge case by the still descending ram to perforate a single row of perforations (in this case ten).

The ram descends low enough to push the slugs resulting from the perforating operation through punch hole 214 and into slug clearance hole 215. Once in this recess the slugs fall by gravity into central slug recess 192 in anvil 174.

Just before the ram reaches the lowermost point of its descent, the lower surface of companion plate 32 impinges upon and depresses air release button 187 atop air valve 183. This action allows a blast of air from inlet pipe 188 to flow along channels 200 on either side of anvil 174 and into central recess 192 by means of end ports 203 and inclined side ports 202. As a result of the air blast, the slugs resulting from the perforating operation are blown out of slug recess 192 and along slug outlet conduit 197 which directs them to an awaiting receptacle (not shown).

By the time ram 38 has reached the lowermost point of its travel, index pin 112 in thimble 107 has reached the lower end of index groove 91.

As the ram begins to ascend, the cam actions merely dwell for a while. That is, rotary index pin 112 begins its travel back up along the lower straight portion 93 of rotary index groove; and rear, vertical portion 285 of roller groove 283 travels past roller 248 in roller bar 241. The only motion resulting in the early stages of the upstroke of the press is vertical separation of companion plate 32 from base plate 31.

As the ram continues to rise, the punches are carried upward out of engagement with the cartridge case, the sloped portion 286 of roller groove 283 has begun to contact rollers 248; and rotary index pin 112 reaches the beginning of sloped connecting groove 97 in index spindle 90.

As the sloped portions 286 of the roller grooves pass by rollers 248, roller bars 241 to which the rollers are attached are given a rectilinear movement toward the front of the fixture. This movement results in movement of wedge 220 toward the head end of the cartridge case. When the wedge is moved to this position, its clamping pressure against the cartridge case is released to allow for subsequent rotary and axial indexing of the cartridge case which is now about to take place in the following manner.

As the ram's upstroke continues, rotary indexing pin 112 reaches shoulder 96 which forms one side of helical communicating groove 97. This step is abrupt (as shown in Fig. 9) and rather deep (as shown in Fig. 12) and so it does not exert any depressing effect upon spring 113. Therefore, as the upstroke continues, index pin 112 commences to travel along communicating groove 97 toward the next adjacent straight groove 91. In traveling along the helical communicating groove, index pin 112, traveling vertically up, has a camming action (see Fig. 27) which causes rotation of index spindle 90 in a clockwise direction as viewed from above.

Rotation of the index spindle also results in rotation of bevel pinion gear 102 which is pinned thereto as shown in Fig. 12. This rotation of bevel pinion gear 102 is also transmitted to its mating ring gear 60. Inasmuch as the ring gear is keyed at 78 to chuck 57, the chuck in which the cartridge case is clamped is also rotated.

Rotation of chuck 57 causes its own, and the contained cartridge case's, axial indexing as will now be explained. Undulating peripheral groove 77 in chuck 57 is engaged at three strategic locations by means of chuck pins 69 which are secured in housing 50. As the chuck rotates and carries its undulating groove 77 past these pins, it is easy to see that, as a result, the chuck will be moved axially out and thus cause the holes in one row of perforations in the cartridge case to be staggered in relation to the next row (see Fig. 24).

As will be obvious to those skilled in the mechanical arts, both the rotary and the axial indexing occurring in our fixture take place only intermittently. That is, they occur on each upstroke of the press, but only after the punches have risen clear of the cartridge case and after wedge 220 has been moved to its released position.

In this particular fixture we have arranged the rotary indexing to be equivalent to the angular distance between each longitudinal row of holes, but this would not necessarily be required. If desired, we could arrange to have the rotary indexing equivalent to twice or more angular distance between each row of holes.

As far as the axial indexing is concerned, it is equivalent to one half the distance between holes in a longitudinal row.

Rotation of index spindle 90 ceases when index pin 112 reaches the end of communicating helical groove 97. At that time, the index pin snaps into the straight portion 92 of the straight groove 91 (see Fig. 12). The ram then continues on to the top of its upstroke. By the time the ram has reached the top of its upstroke, the cartridge case has been indexed both axially and radially in preparation for piercing the next row of holes on the next downstroke of the ram.

If, for some reason, the indexing spindle should be unable to rotate as the press ram rises, thimble 107 will, as a result, be caused to rotate in a counterclockwise direction as viewed from above (see Fig. 2). This rotation of the thimble pivots pawl 116 toward contact pin 126 of "Microswitch" 118. A very small movement of the pawl causes it to abut the contact pin, at which time an electric circuit to solenoid 323 is completed. As earlier mentioned, the solenoid, when energized, causes the press's clutch to become disengaged and its action arrested. By this safety apparatus, damage to the workpiece or the fixture is obviated.

The clamping, perforating, unclamping and indexing operations continue in described fashion until chuck 57 has completed one revolution. At that time switch lug 88 on chuck 57 contacts button 89 of electric switch 55 closing the electrical circuit to solenoid 323 which promptly declutches the machine and results in automatic stopping thereof.

Figure 24:
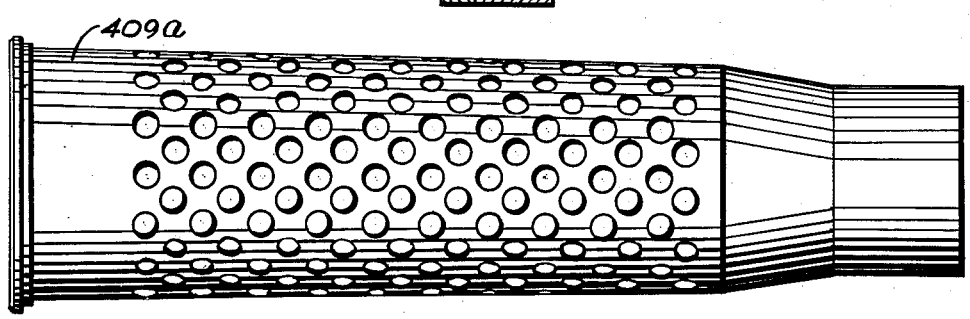
Fig. 24 is a view of a representative hollow, tapered, cylindrical workpiece in the form of a cartridge case after perforating its sidewall by means of our fixture.

The cartridge case clamp is manually loosened and removed, the perforated cartridge case is removed by pulling back on wedge operating rod 164 which now acts as an ejector, and another case is loaded into the machine. Fig. 24 shows an illustrative cartridge case 409A following perforation by use of our fixture.

*Modified front end construction*

The manner of positioning the cartridge in our fixture, and the manner of obtaining axial and rotary indexing may also be accomplished in the manner depicted by a modified construction shown in Figs. 19 to 23 inclusive.

VERTICAL PLATE AND SLIDE BLOCKS

Figure 22:
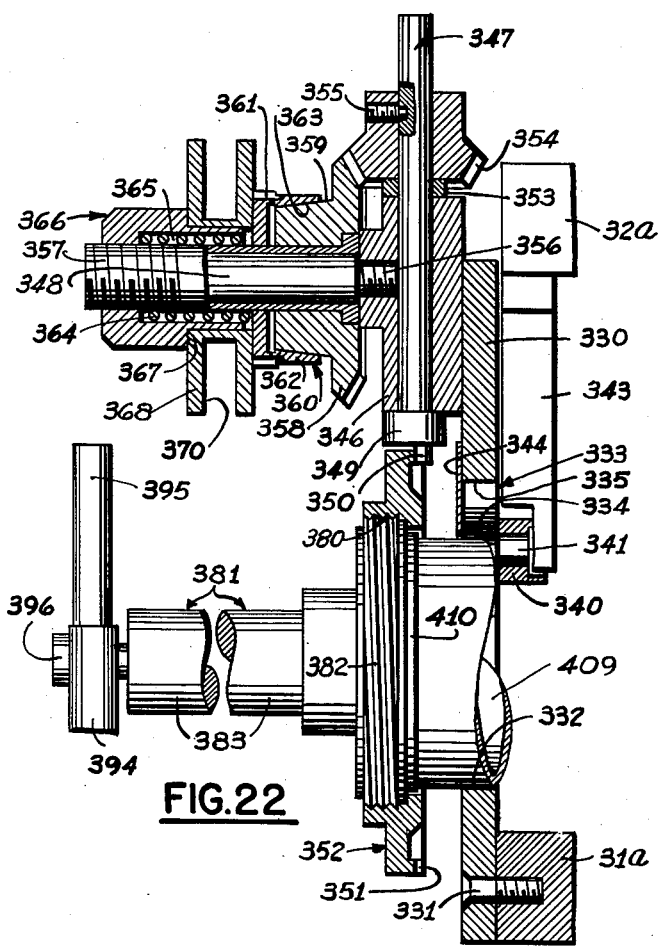
Fig. 22 is a vertical section taken along line 22—22 of Fig. 19 and showing additional details of the modified clamping and indexing mechanism.

In the modified structure, a vertical plate 330 is secured by means of screws 331 to base plate 31A (see Figs. 19 and 22). A recess 332 formed in the central portion of the vertical plate removably supports the cartridge case 409 to be perforated (see Fig. 22).

Slide blocks 333, having a shaped medial edge 334, are supported in a recess 335 which extends substantially across the vertical plate. Each slide block is provided with a stud 336 which projects from its outside face far enough to provide for the attachment thereto, in any convenient manner, of one end of a coil spring 337. The other end of the coil spring is similarly attached to a stud 338 secured to vertical plate 330 (see Fig. 19). It will be obvious, therefore, that each slide block is constantly pulled away from the center of the fixture by means of springs 337.

The inside face of each slide block is provided with a roller 340 secured thereto and rotating upon a shoulder screw 341 which is concentric with stud 336. (In Fig. 19 only one roller 340 is indicated as being concentric with one stud 336. However, it should be understood that the other stud 336 there shown also has a like roller concentric therewith, but not shown.) Each roller contacts the inner surface 342 of a cam 343 which is secured to companion plate 32A. As the companion plate descends, each slide block is pushed toward the cartridge case. When the companion plate rises, springs 337 pull the blocks outward to their Fig. 19 position. These slide blocks are retained in vertical plate 330 by a cover plate 344, having a slot 369, which is secured to the vertical plate by means of screws 345 (see Fig. 19). In order not to interfere with insertion and removal of the cartridge case from the fixture, the central portion of the cover plate is recessed (see Fig. 22).

SUPPORT BLOCK, INDEX SPINDLE, AND PINION GEAR

Secured to the upper central portion of vertical plate 330 by any convenient means (not shown) is a support block 346. This support block contains the vertically positioned, rotatable index spindle 347 and a fixed, horizontally positioned stud 348 (see Figs. 19 and 22). The index spindle has an enlarged portion 349 (see Fig. 21) which contains two vertically positioned, downwardly extending and eccentrically located cylindrical pins 350. As indicated in Fig. 21, these pins are the same radial distance from the axis of index spindle 347 and, as shown in Fig. 20, are adjacently spaced so as to mate with serrations 351 in the inner face of a case plate 352, later to be described.

At its upper end, the index spindle is provided with a thrust collar 353 and a beveled pinion gear 354. The pinion gear is secured in place by means of a set screw 355 and is so positioned that index spindle 347 has a minimum of endshake.

Stud 348 is threadedly attached as at 356 to the support block. Rotatably mounted upon the stud is an elongated sleeve 357 (see Fig. 22). This sleeve, for obvious reasons, is prevented from axial movement along the stud by any convenient means (not shown).

RING GEAR AND RATCHET WHEEL

Rotatably mounted upon sleeve 357 is the beveled ring gear 358 having the tapered hub 359 (see Fig. 22). Also rotatably mounted upon the sleeve is a ratchet wheel 360 having four equally spaced saw toothed notches 361 (see Figs. 19 and 22). As shown in Fig. 22, the ratchet wheel's hub 362 is provided with a tapered recess 363 which mates with tapered hub 359 of bevel gear 358. These two parts are pressed into firm frictional contact by means of a coil spring 364 whose outer end presses against the bottom of a recess 365 in a cap 366 threadedly mounted upon the outer end of sleeve 357. Cap 366 is maintained in position upon the sleeve in any convenient manner, as by a set screw (not shown).

Confined against axial movement between the outer face of ratchet wheel 360 and a shoulder 367 on cap 366, but free to rotate upon said cap, is a pawl wheel 368 (see Fig. 22). This pawl wheel contains a deep circumferential groove 370 in its periphery. Between the sides of this groove a U-shaped pawl 371 (see Fig. 19) is pivotally mounted upon a pin 372 which is secured, as by press fit, into the pawl wheel. This pawl extends outside the pawl wheel, then rearwardly over its circumference, and radially inward to engage one of the saw-toothed notches 361 in the ratchet wheel.

Also mounted in groove 370, and rotatable upon a pin 373 secured in pawl wheel 368 as by press fit is a link 374 (see Fig. 19). Threadedly connected to the outer end of this link, to which it is pinned as at 375, is a threaded push rod 376 which is provided with adjustably positioned upper and lower stop collars 377 and 378, respectively. This push rod slidably passes through a bracket 379 secured in any convenient manner (not shown) to the upper surface of companion plate 32A.

CASE PLATE AND CLAMP PLUG

In our modified structure the head 410 of the cartridge case to be perforated is accommodated in a threaded recess 380 in case plate 352 (see Fig. 22). As shown in Fig. 22, the outer portion of the inside face of the case plate is provided with the semi-circular, radially extending serrations 351. These serrations, as shown in Fig. 20, are engaged by pins 350 in index spindle 347.

From the discussion this far it is evident that rotation of the index spindle will result in both rotation and axial displacement of case plate 352. More will be said about this later.

In order to clamp, in our modified fixture, the head of the cartridge case to be perforated, we provide a clamp plug 381. From Fig. 22 this plug will be seen to consist of an inner threaded end 382, which engages threaded recess 380 in the case plate, and an outer shank portion 383. It is clear from Fig. 22 that clamp plug 381 can be made to exert clamping pressure upon the head of the cartridge case so as to prevent relative rotation between the case plate and the cartridge case.

PUSHER MECHANISM

In order to index properly it is necessary that case plate 352 constantly be pressed against pins 350. This requirement is met by a pusher mechanism 384 (see Figs. 19 and 23) now to be described.

Figure 23:
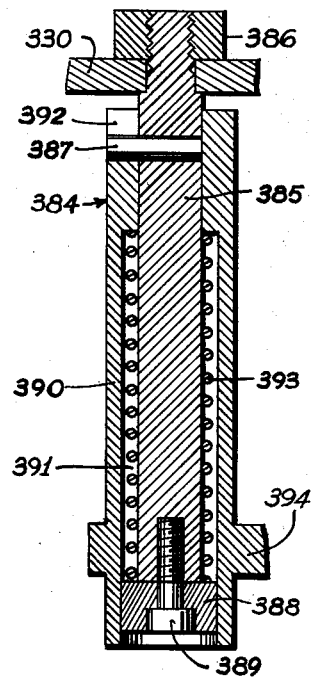
Fig. 23 is a horizontal section taken along line 23—23 of Fig. 19 and showing part of the clamping structure in the modified construction.

Referring to Fig. 23, a stud 385, secured in position by a nut 386, projects outward from the face of vertical plate 330. As seen in Fig. 19 this stud is near the lower, left corner of the vertical plate, and is offset somewhat from the axial center of case plate 352. Projecting from one side of the stud near its inner end is a pin 387 (see Fig. 23) whose purpose will be explained later. The outer end of the stud 385 is provided with a cap plate 388, of somewhat larger diameter, which is secured in place by means of a screw 389.

Axially slidable on stud 385 and cap plate 388 is a cylindrical member 390 whose internal axial recess 391 is slightly greater in diameter than cap plate 388. In Fig. 23 can be seen a U-shaped groove 392 which slidably fits around pin 387 in stud 385. Confined between the inner end of recess 391 and the inner face of cap plate 388 is a coil spring 393 which acts constantly to urge cylindrical member 390 toward vertical plate 330.

Near the outer end of cylindrical member 390 to which it is secured, as by welding, is an arm 394 having a handle 395 (see Figs. 19 and 22). The arm is provided with a threadedly attached pressure stud 396 whose inner end (see Fig. 22) bears upon shank 383 thereby urging case plate 352, to which it is attached, toward pins 350. Handle 395 is provided for convenience of use of our modified fixture and merits no additional description.

Operation of our modified perforating fixture

The operation of our modified fixture closely parallels the operation of the fixture previously described. Since the only difference between the two fixtures resides in a variation in construction and operation of the cartridge case clamping and indexing mechanism, the description of the operation of the modified fixture need concern itself only with that aspect.

At the outset, let us assume that base plate 31A and companion plate 32A are at their maximum distance apart and that arm 394 carrying pressure stud 396 has been rotated so as not to interfere with introducing the cartridge case into the fixture.

Aside from the fixture, the cartridge case 409 to be perforated is clamped in case plate 352 by means of clamp plug 381 (see Fig. 22). The cartridge case is then placed on the fixture's anvil as before described. When the case is properly positioned, serrations 351 in the case plate will rest against pins 350. By means of handle 395 and arm 394, cylindrical member 390 is pulled out and rotated until pressure stud 396 is in alignment with shank 383 of the clamp plug. At the position of alignment, groove 392 in circular member 390 is in alignment with pin 387 which projects from stud 385. The pull on the cylindrical member is released, and groove 392 mates with pin 387 to prevent accidental movement of the pressure stud off the shank of the clamp plug.

As companion plate 32A descends, slide blocks 333 are moved radially inward into light contact with the cartridge case by the action of the plate's cams 343 on the blocks' rollers 349, the wedge tightening action earlier mentioned takes place, and the case is perforated. In addition, pawl wheel 368 is moved in a clockwise direction by the action of the companion plate's bracket 379 against the push rod's lower stop collar 378 (see Fig. 19) so that pawl 371 moves into engagement with the adjacent saw-toothed notch 361 of the now non-rotating ratchet wheel 360.

As the companion plate rises, the cartridge case is stripped from the withdrawing punches by the slide blocks, and the wedge clamping action is released, as earlier mentioned. In addition, the pawl wheel is moved in a counterclockwise direction by the action of the companion plate's bracket against the push rod's upper stop collar 377 (see Fig. 19). Because the wheel's pawl is in engagement with the ratchet wheel, that wheel also moves in a counterclockwise direction. This angular movement of the ratchet wheel, in turn, causes partial rotation in the same direction of ring gear 358 because of the spring pressured, frictional contact between those two parts (see Fig. 22). As the ring gear is moved, corresponding angular movement is imparted to its mating beveled pinion 354 and index spindle 347 attached thereto.

Such relationship exists between the reciprocating travel of the companion plate, the angular movement of the ratchet wheel, and the ratio between the pinion and ring gears that the index spindle is rotated one half a revolution (180°) in a clockwise direction as viewed from above (see Fig. 21) during each ascent of the fixture's companion plate.

This intermittent angular movement of the index spindle each time the companion plate rises causes case plate 352, and the cartridge case mounted therein, simultaneously to be indexed both axially (i. e. in a direction along the axis of the cartridge case) and angularly (i. e. in a direction around the axis of the cartridge case) because of the coaction between the index spindle's eccentrically located pins 350 and the case plate's serrations 351 (see Figs. 20, 21, and 22).

As will be evident from those figures the axial indexing is reciprocatory and is equal to twice the perpendicular distance from an imaginary line passing through the axes of the eccentrically located pins to the axis of the index spindle. The angular or rotative indexing, on the other hand, is in a counterclockwise direction only.

The indexing and perforating operations are repeated in the manner described until the cartridge case's wall is completely perforated. At that time the fixture's operation is automatically stopped by mechanism earlier described in the alternate construction.

*Summary*

From the foregoing it will be evident that we have provided an automatically indexable perforating fixture for hollow, tapered cylindrical objects; that we have provided a perforating fixture in which the anvil is rigidly supported from below by a sliding wedge; that we have provided a perforating fixture equipped with automatically operated safety devices to stop the machine at the completion of its perforating cycle or at the failure of the indexing mechanism; and that we have provided a perforating fixture incorporating a quickly applied and removed clamping device.

Since the description and drawings here presented for illustrative purposes only, show but preferred and alternate embodiment of our invention, and since our inventive concept is capable of further modifications and variations without departing from its original spirit and scope, we do not wish to be limited by the narrow confines established in the description, but rather by the breadth and scope of the attached claims.

We claim:

1. The combination, with a machine having a fixed bed and a reciprocating ram which moves perpendicularly to said fixed bed, of apparatus for perforating a hollow, cylindrical workpiece, said apparatus comprising: a fixed base plate secured to said machine's fixed bed; a companion plate secured to the machine's reciprocating ram in alignment with said base plate so as to move rectilinearly toward and away from said base plate; a punch block secured to the lower surface of said companion plate and carrying a plurality of punches spaced in a straight line along the axis of the workpiece so that the axes of the punches are perpendicular to said base plate; supporting means for the exterior surface of said workpiece holding it in position for operation thereon by said punches; and means for interiorly supporting the sidewall of the workpiece to prevent its deformation when said punches act thereon, consisting of a wedge whose lower surface slidingly fits against a portion of the workpiece's interior wall and whose upper surface is sloped, an anvil whose lower surface is sloped to fit against the sloped surface of said wedge member, an anvil support block, means depending from said anvil for supporting said wedge member in slidable relationship with the anvil, a die block with holes for matingly receiving said punches secured to the upper surface of said anvil and shaped for slide fitting relationship with a portion of the workpiece's interior wall, a draw bar secured at its forward end to said wedge, a pair of parallel guide bars each supported by said anvil support block on opposing sides of said draw bar, a pair of parallel roller bars each supported in mutual confronting relationship on the side of a corresponding one of said guide bars, a roller on each of said roller bars, a yoke joining the rear ends of said roller bars, a latch borne by said yoke, a pair of plate cams depending from said companion plate and bearing opposed cam grooves which engagingly receive a corresponding one of said rollers so that as said plate cams are vertically reciprocated the roller bars are alternately caused to move forward and rearward, a saddle slidably straddling said roller and guide bars and secured to the end of said draw bar distal to said wedge, and resiliently operable jaws pivotably attached to said saddle for selective engagement with said latch, whereby upon rearward movement of said roller bars, saddle and draw bar the wedge is pulled rearwardly against the anvil so as to form a snug fitting wall support across the interior sidewall of the workpiece, but upon forward movement of the roller bars the wedge is pushed forwardly so as to be released from its workpiece-supporting association with the anvil and allow for indexing the workpiece.

2. In the device of claim 1, hand-operated means for selectively drawing tight the wedge against the anvil to support the interior wall of the workpiece during the perforating operation and for releasing the wedge so that the workpiece can readily be inserted in or withdrawn from the proper operating position, said means comprising: a jaw lever pivotably secured to the saddle, a jaw spreading stud projecting from said jaw lever, forward and rear stop pins on said saddle for limiting the movement of the jaw lever, and a wedge operating rod secured to said jaw lever, whereby a forward tug on said rod will move the lever up to the forward stop pin and thereafter cause the stud to spread the jaws and allow forward movement of the saddle and draw bar and attached wedge, and rearward movement of the rod will push the lever up to the rear stop pin and then remove the stud from the jaw-spreading position as the saddle and draw bar and attached wedge are moved rearwardly into tight-fitting relationship with the anvil.

3. In combination with a machine having a crankshaft and a reciprocating ram apparatus for punching successive rows of holes through the sidewall of a hollow cylindrical workpiece, comprising: a chuck; a clamp associated with said chuck for selectively securing against and permitting axial and rotative movement of the workpiece; a plurality of punches mounted in a straight row and secured to said ram for reciprocatingly acting upon the sidewall of the workpiece along a line which is parallel to the axis of said workpiece; means for interiorly supporting the sidewall of the workpiece to prevent its deformation when said punch means acts thereon; and indexing means for moving the workpiece to successively rotated positions in between each action thereon by said punches, consisting of a thimble attached to said ram for reciprocal movement therewith, a rotatable spindle over which said thimble slidably fits and bearing a series of cam-like grooves spaced around the spindle's exterior and interconnected by a substantially helical groove, a resiliently stressed indexing pin carried by said thimble for indexing engagement with the interconnected grooves in said spindle, a pinion gear secured to and extending from said spindle for rotation therewith, and a ring gear in meshed relationship with said pinion gear and keyed to said clamp so that rotation of the ring gear will cause rotation of the clamp and the workpiece held thereby.

4. In combination with an electrically powered machine having a crankshaft and a reciprocating ram; apparatus for punching successive rows of holes through the sidewalll of a hollow, cylindrical workpiece, comprising: a chuck; a clamp associated with said chuck for selectively securing against and permitting axial and rotative movement of the workpiece; a plurality of punches mounted in a straight row and secured to said ram for reciprocatingly acting upon the sidewall of the workpiece along a line which is parallel to the axis of said workpiece; means for interiorly supporting the sidewall of the workpiece to prevent its deformation when said punch means acts thereon; indexing means for moving the workpiece to successively rotated positions in between each action thereon by said punches, consisting of a thimble attached to said ram for reciprocal movement therewith, a rotatable spindle over which said thimble slidably fits and bearing a series of cam-like grooves spaced around the spindle's exterior and interconnected by a substantially helical groove, a resiliently stressed indexing pin carried by said thimble for indexing engagement with the interconnected grooves in said spindle, a pinion gear secured to and extending from said spindle for rotation therewith, and a ring gear in meshed relationship with said pinion gear and keyed to said clamp so that rotation of the ring gear will cause rotation of the clamp and the workpiece held thereby; and means for stopping operation of the machine in the event that said spindle should fail to rotate as required, consisting of a flange extending from said thimble and bearing a groove, a pivotally mounted pawl engaged with the groove in said flange so that axial movement of the thimble will leave the pawl stationary but rotative movement of the thimble will cause the pawl to pivot, a "Microswitch" electrically connected to the power source for operating said machine and positioned in close proximity to said pawl, and a backstop preventing the pawl from pivoting in any direction except toward said microswitch, whereby non-rotation of the spindle will cause the thimble, to which it is keyed by the indexing pin, to rotate and move the pawl into contact with the "Microswitch" and thus stop operation of the machine.

5. In combination with a machine having a crankshaft and a repracting ram, apparatus for punching successive, staggered rows of holes through the sidewall of a hollow, cylindrical workpiece, comprising: a stationary housing; a chuck axially and rotatively slidable in said housing and having an undulating groove encircling its periphery; a clamp associated with said chuck for selectively securing against and permitting axial and rotative movement of the workpiece; a plurality of punches mounted in a straight row and secured to said ram for reciprocatingly acting upon the sidewall of the workpiece along a line which is parallel to the axis of said workpiece; means for interiorly supporting the sidewall of the workpiece to prevent its deformation when said punch means acts thereon; and indexing means for intermittently moving the workpiece to successively rotated and axially displaced positions in between each action thereon by said punches, consisting of a thimble attached to said ram for reciprocal movement therewith, a rotatable spindle over which said thimble slidably fits and bearing a series of cam-like grooves spaced around the spindle's exterior and interconnected by a substantially helical groove, a resiliently stressed indexing pin carried by said thimble for indexing engagement with the grooves in said spindle, a pinion gear secured to and extending from said spindle for rotation therewith, a ring gear in meshed relationship with said pinion gear and keyed to said clamp so that rotation of the ring gear will cause rotation of the clamp and the workpiece held thereby, and a chuck pin secured in said housing and extending into registry with the undulating groove in said chuck so that as the chuck is rotated it will likewise be displaced axially in conformity with the path followed by the grooved portion of the chuck past the chuck pin.

6. In combination with a machine having a crankshaft and a reciprocating ram, apparatus for punching successive rows of holes in staggered relationship to each other through the sidewall of a hollow cylindrical workpiece, comprising: a circular plate having a central opening therethrough for supportingly accommodating one end of the workpiece and further having adjacent the plate's periphery a circumferential row of continuous serrations, a plurality of punches mounted in a straight row and secured to said ram for reciprocatingly acting upon the sidewall of the workpiece along a line which is parallel to the axis of the workpiece, means for interiorly supporting the sidewall of the workpiece to prevent its deformation when said punch means acts thereon, an indexing spindle having at least two cylindrical pins eccentrically located with respect to the axis of said spindle in registry with the serrations in siad plate, spring-stressed means connected to said plate and serving constantly to urge the serrated portion of the plate against said spindle's pins, a pinion gear secured to said spindle for rotation therewith, a ring gear meshed with said pinion gear, a ratchet wheel having a notched periphery mounted on said ring gear for rotation therewith, a pawl wheel having a deep circumferential groove in its periphery and mounted for rotation about the same axis as that of the ratchet wheel but independently thereof, a pawl pivotally mounted in the groove of said pawl wheel but extending over the groove's edge into registry with the notches in said ratchet wheel, and a push rod pivotally connected at one end to said pawl wheel and at the other end having a flanged portion which is linked with the machine's crankshaft, whereby each revolution of the crankshaft causes reciprocation of the push rod resulting in oscillation of the pawl wheel and intermittent rotation of the ratchet wheel which in turn rotates the ring gear, pinion gear and spindle so as to move the workpiece to successively rotate and axially displaced positions in between each action thereon by said punch means.

C. WALTON MUSSER.
PAUL L. FOX.

REFERENCES CITED

The following references are of record in the file of this patent:

UNITED STATES PATENTS

| Number | Name | Date |
| --- | --- | --- |
| 295,090 | Whitman | Mar. 11, 1884 |
| 1,283,829 | Loesser | Nov. 5, 1918 |
| 1,398,320 | Dunsworth | Nov. 29, 1921 |
| 1,764,129 | Trumble | June 17, 1930 |

FOREIGN PATENTS

| Number | Country | Date |
| --- | --- | --- |
| 561,602 | Great Britain | May 25, 1944 |